United States Patent
Niwa et al.

(10) Patent No.: US 10,569,207 B2
(45) Date of Patent: Feb. 25, 2020

(54) EXHAUST GAS FILTER

(71) Applicant: DENSO CORPORATION, Kariya, Aichi-pref. (JP)

(72) Inventors: Hironori Niwa, Kariya (JP); Syusaku Yamamura, Kariya (JP); Mikio Ishihara, Kariya (JP); Takao Mishima, Kariya (JP); Shingo Nakata, Kariya (JP); Hiroaki Fujii, Kariya (JP); Kouta Yamakoshi, Kariya (JP); Akira Miyashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 291 days.

(21) Appl. No.: 15/542,215

(22) PCT Filed: Jan. 5, 2016

(86) PCT No.: PCT/JP2016/050113
§ 371 (c)(1),
(2) Date: Jul. 7, 2017

(87) PCT Pub. No.: WO2016/111287
PCT Pub. Date: Jul. 14, 2016

(65) Prior Publication Data
US 2017/0354911 A1    Dec. 14, 2017

(30) Foreign Application Priority Data

Jan. 9, 2015 (JP) ................................ 2015-003244
Mar. 31, 2015 (JP) ................................ 2015-073492
(Continued)

(51) Int. Cl.
*B01D 46/24* (2006.01)
*F01N 3/022* (2006.01)
*B01D 39/20* (2006.01)

(52) U.S. Cl.
CPC ....... *B01D 46/247* (2013.01); *B01D 39/2068* (2013.01); *B01D 46/2429* (2013.01);
(Continued)

(58) Field of Classification Search
CPC combination set(s) only.
See application file for complete search history.

(56) References Cited

U.S. PATENT DOCUMENTS

2002/0078667 A1    6/2002   Ishihara et al.
2006/0068159 A1    3/2006   Komori et al.
(Continued)

FOREIGN PATENT DOCUMENTS

JP    2003-35126    2/2003
JP    2009-647      1/2009
(Continued)

OTHER PUBLICATIONS

Co-pending U.S. Appl. No. 15/207,810 (35 pgs.).

*Primary Examiner* — Amber R Orlando
(74) *Attorney, Agent, or Firm* — Nixon & Vanderhye P.C.

(57) ABSTRACT

An exhaust gas filter purifies exhaust gas containing particulate matter emitted from an engine. The filter has cell walls and cells surrounded by the cell walls. Through pores formed in the cell walls, adjacent cells are communicated. The cells have open cells opening along an axial direction of the filter, and plugged cells. An upstream end part of the plugged cell is plugged by a plug member. On a cross section perpendicular to the axial direction, a flow-passage sectional area of the plugged cells is larger than a flow-passage sectional area of the open cells. A total length of the filter is not less than a first standard value and is not more than a critical length Lm determined by respective predetermined equations.

9 Claims, 10 Drawing Sheets

(30) Foreign Application Priority Data

Oct. 15, 2015 (JP) .................................. 2015-203861
Dec. 8, 2015 (JP) .................................. 2015-239637

(52) U.S. Cl.
CPC ......... *B01D 46/2459* (2013.01); *F01N 3/022* (2013.01); *F01N 3/0222* (2013.01); *B01D 2046/2481* (2013.01); *B01D 2046/2485* (2013.01); *B01D 2046/2496* (2013.01); *B01D 2279/30* (2013.01); *F01N 2330/00* (2013.01); *F01N 2330/06* (2013.01); *F01N 2330/34* (2013.01); *F01N 2330/48* (2013.01); *Y02T 10/20* (2013.01)

(56) References Cited

U.S. PATENT DOCUMENTS

| | | | |
|---|---|---|---|
| 2006/0188415 A1 | 8/2006 | Ohno et al. | |
| 2006/0194018 A1 | 8/2006 | Ohno et al. | |
| 2009/0056546 A1* | 3/2009 | Bazyn | B01D 46/247 95/273 |
| 2009/0297766 A1 | 12/2009 | Furuta | |
| 2011/0132194 A1* | 6/2011 | Ahmed | B01D 46/2429 95/273 |
| 2017/0016366 A1 | 1/2017 | Suzawa et al. | |

FOREIGN PATENT DOCUMENTS

| | | |
|---|---|---|
| JP | 2011-212508 | 10/2011 |
| JP | 2012-210581 | 11/2012 |
| WO | WO 2012/046484 | 4/2012 |

\* cited by examiner

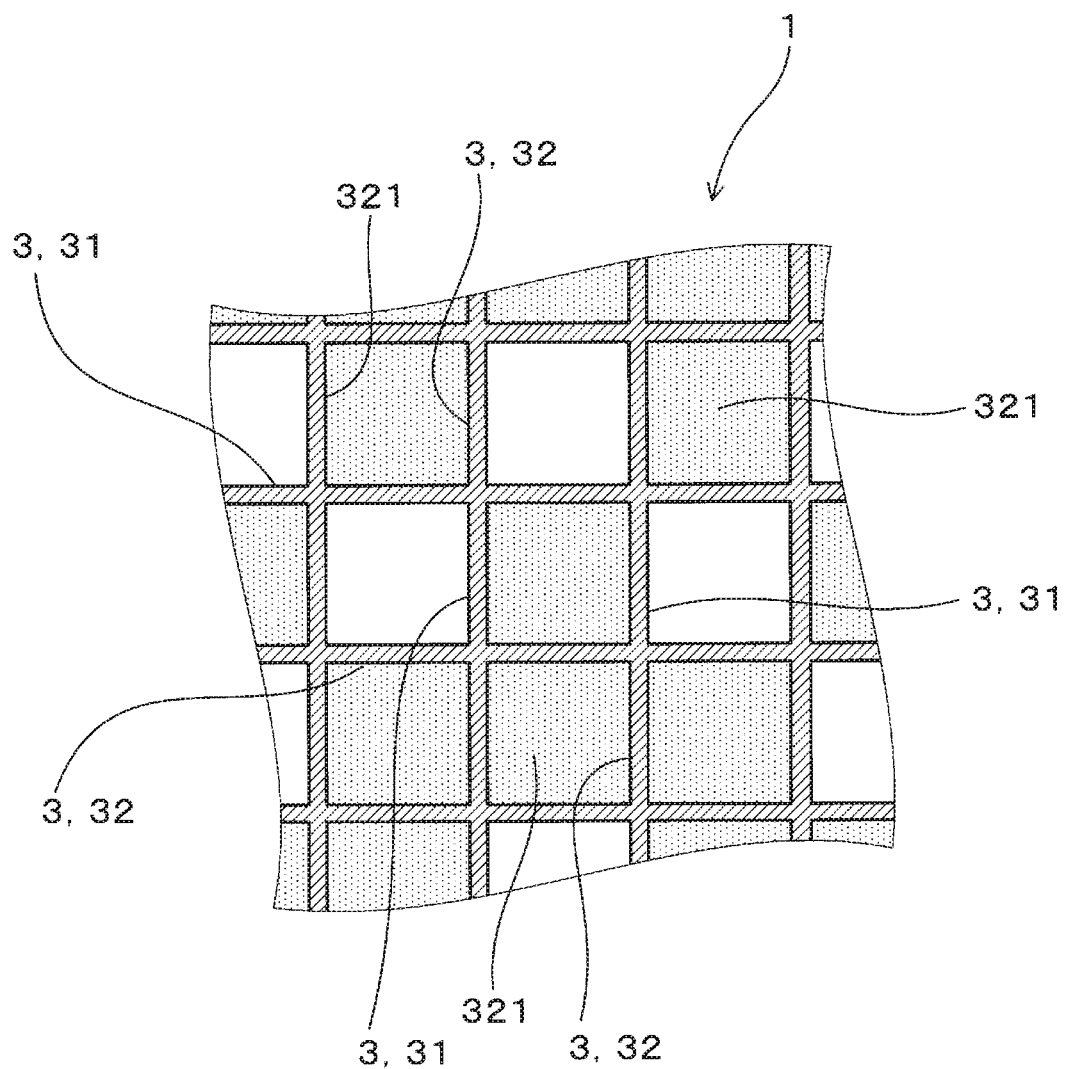

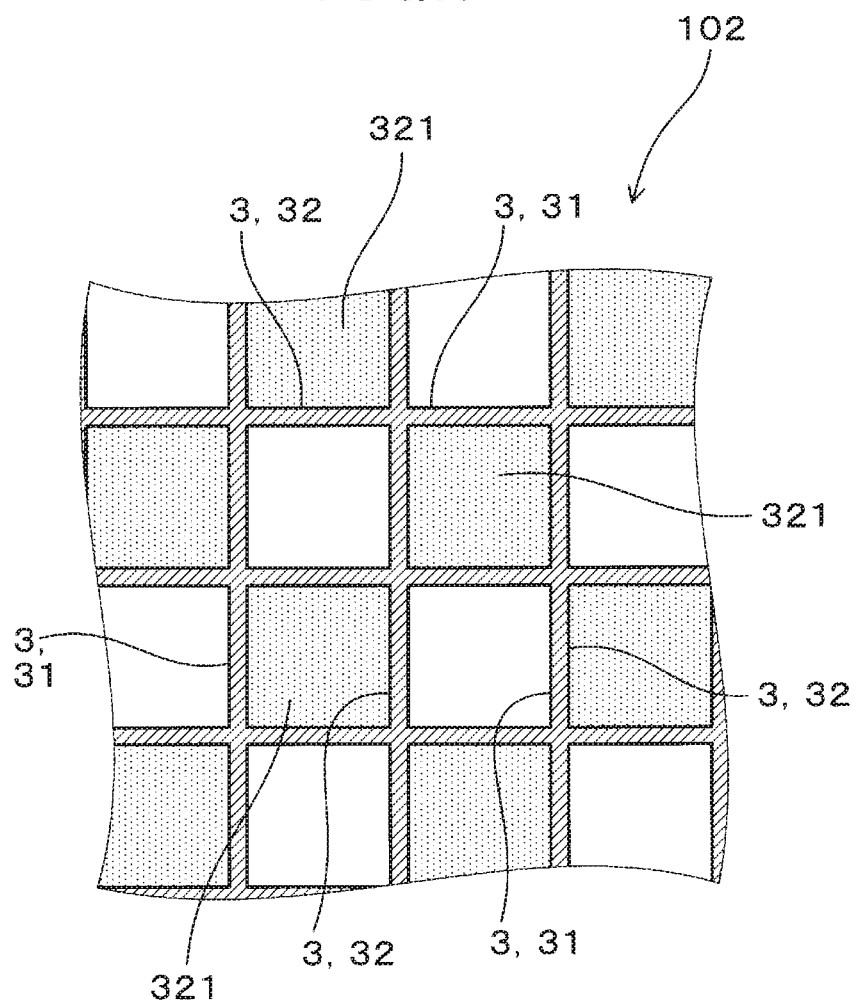

EXHAUST GAS FILTER

This application is the U.S. national phase of International Application No. PCT/JP2016/050113 filed Jan. 5, 2016 which designated the U.S. and claims priority to Japanese Patent Application No. 2015-003244 filed Jan. 9, 2015, Japanese Patent Application No. 2015-073492 filed Mar. 31, 2015, Japanese Patent Application No. 2015-203861 filed Oct. 15, 2015 and Japanese Patent Application No. 2015-239637 filed Dec. 8, 2015, the entire contents of each of which are hereby incorporated by reference.

TECHNICAL FIELD

The present invention relates to exhaust gas filters capable of purifying exhaust gas emitted from internal combustion engines such as gasoline engines, diesel engines, etc.

BACKGROUND ART

An exhaust gas purification device is mounted in an exhaust gas pipe of an internal combustion engine such as a gasoline engine, a diesel engine, etc. The exhaust gas purification device captures particulate matter (PM) contained in exhaust gas emitted from the internal combustion engine, and collects the particulate matter.

The exhaust gas purification device has an exhaust gas filter for collecting particulate matter contained in exhaust gas. (See patent document 1 and patent document 2)

The exhaust gas filter disclosed in patent document 1 and patent document 2 has a plurality of cell walls and cells. Each cell is surrounded by the cell walls. The cells are composed of plugged cells and open cells. An end part at an upstream side of each of the plugged cells is plugged by a plug member. Each of the open cells is not plugged by a plug member. Pores are formed in the cell walls which are adjacently arranged between the plugged cell and the open cell so as to allow exhaust gas to flow between the plugged cell and the open cell. When exhaust gas is flowing through the pores formed in the cell walls between the plugged cell and the open cell, the pores trap particulate matter contained in exhaust gas so as to eliminate the particulate matter from the exhaust gas. In addition, patent document 1 has disclosed an exhaust gas purification device having a structure in which plural exhaust gas filters are arranged in series so as to increase particulate matter collection capability.

CITATION LIST

Patent Literature

[Patent document 1] International publication No. WO-2012-046484.
[Patent document 2] Japanese patent laid open publication No. JP 2003-35126.

SUMMARY OF INVENTION

Technical Problem

However, the exhaust gas filter disclosed in patent document 1 and patent document 2 has the following drawback. In the exhaust gas filter, exhaust gas enters and penetrates the pores formed in the cell walls due to a pressure difference between a pressure loss in the open cell without a plug member and a pressure loss in the plugged cell with the plug member. For this reason, this structure requires a predetermined pressure difference between the plugged cell and the open cell in the exhaust gas filter. When this predetermined pressure difference is not generated, exhaust gas, which is flowing in the open cell without a plug member, cannot pass through the cell walls between them, and is discharged from the open cell without a plug member. This reduces the collection capability of collecting particulate matter contained in exhaust gas.

In the exhaust gas filter disclosed in patent document 1 and patent document 2, because the plugged cell and the open cell have the same flow passage cross sectional area, there is a small difference in pressure loss between the plugged cell and the open cell. This structure cannot provide adequate collection performance for collecting particulate matter in exhaust gas.

Further, because the exhaust gas purification device disclosed in patent document 1 has the structure in which plural exhaust gas filters are arranged in series, this structure has a reduced mountability for mounting the exhaust gas purification device to a vehicle. That is, it is possible to mount the exhaust gas purification device disclosed in patent document 1 to a vehicle having an adequate mounting space to mount the exhaust gas purification device. Further, the exhaust gas purification device previously described easily increases the pressure loss.

The present invention has been made in consideration of the foregoing circumstances, and it is an object of the present invention to provide an exhaust gas purification device having improved collection performance of collecting particulate matter contained in exhaust gas emitted from an internal combustion engine such as a gasoline engine and a diesel engine, a reduced pressure loss and a superior mountability onto a vehicle while suppressing the pressure loss from increasing and mountability of the exhaust gas purification device to a vehicle from reducing.

Solution to Problem

In accordance with a first aspect of the present invention, there is provided an exhaust gas filter capable of purifying exhaust gas which contains particulate matter emitted from an internal combustion engine. The exhaust gas filter has a plurality of cell walls and cells. Each of the cells is surrounded by the cell walls. Plural pores are formed in the cell walls. The cells are formed along an axial direction of the exhaust gas filter. The cells are composed of plugged cells and open cells. Each of the open cells is open along an axial direction of the exhaust gas filter, and forms a through hole. An end part at an upstream side of each of the plugged cells is plugged by a plug member. Pores are formed in the cell walls which are adjacently arranged between the plugged cell and the open cell in order for exhaust gas to pass from the open cell to the plugged cell.

The exhaust gas filter satisfies the following: on a cross section of the exhaust gas filter, which is perpendicular to the axial direction of the exhaust gas filter, a flow passage cross sectional area $S2$ of the plugged cells is larger than a flow passage cross sectional area $S1$ of the open cells; and a total length $L$ (i.e., a base member length $L$) of the exhaust gas filter is not less than a first standard value $L1$ which is determined by the following equation (1), and is not more than a critical length $Lm$ (i.e. an open critical length $Lm$) which is determined by the following equation (M), where $$L1 = -3.7 \times Rs^{1.5} - 3.6/w + 9.7/k - 152.9 \times C + 2241.5/\phi + 145.1 \quad (1), \text{ and}$$

$$Lm = -5.5 \times Rs^{1.5} - 6.0/w + 44.9/k - 234.9 \times C + 176.7/\phi + 255.6 \quad (M),$$

where w indicates a thickness (mm) of each cell wall, k indicates a permeability coefficient ($\mu m^2$) to exhaust gas, C indicates a cell density (cells/$mm^2$), $\phi$ designates an outer diameter (mm) of the exhaust gas filter, and Rs designates a flow passage cross sectional area ratio S1/S2.

In accordance with a second aspect of the present invention, there is provided an exhaust gas filter (1) capable of purifying exhaust gas which contains particulate matter emitted from an internal combustion engine. The exhaust gas filter has a plurality of cell walls (2) and cells (3). Each of the cells (3) is surrounded by the cell walls (2). Plural pores are formed in the cell walls (2). The cells (3) are formed along an axial direction of the exhaust gas filter (1). The cells (3) are composed of plugged cells (31) and open cells (32). Each of the open cells (31) is open along an axial direction of the exhaust gas filter, and forms a through hole. An end part at an upstream side of each of the plugged cells (32) is plugged by a plug member. Pores are formed in the cell walls (2) which are adjacently arranged between the plugged cell and the open cell in order for exhaust gas to pass from the open cell to the plugged cell. The exhaust gas filter (1) satisfies the following: on a cross section of the exhaust gas filter, which is perpendicular to the axial direction of the exhaust gas filter, a flow passage cross sectional area S2 of the plugged cells is larger than a flow passage cross sectional area S1 of the open cells; and a total length L (i.e., a base member length L) of the exhaust gas filter (1) is not less than a second standard value L2 which is determined by the following equation (2), and is not more than a critical length Lm (i.e. an open critical length Lm) which is determined by the following equation (M), where $$L2 = -13.4 \times Rs^{1.5} + 0.76/w + 3.2/k - 132.1 \times C + 1117.3/\phi + 174.4 \quad (2), \text{ and}$$

$$Lm = -5.5 \times Rs^{1.5} - 6.0/w + 44.9/k - 234.9 \times C + 176.7/\phi + 255.6 \quad (M),$$

where w indicates a thickness (mm) of each cell wall, k indicates a permeability coefficient ($\mu m^2$) to exhaust gas, C indicates a cell density (cells/$mm^2$), $\phi$ designates an outer diameter (mm) of the exhaust gas filter, and Rs designates a flow passage cross sectional area ratio S1/S2.

In accordance with a third aspect of the present invention, there is provided an exhaust gas filter (1) capable of purifying exhaust gas which contains particulate matter emitted from an internal combustion engine. The exhaust gas filter has a plurality of cell walls (2) and cells (3). Each of the cells (3) is surrounded by the cell walls (2). Plural pores are formed in the cell walls (2). The cells (3) are formed along an axial direction of the exhaust gas filter (1). The cells (3) are composed of plugged cells (31) and open cells (32). Each of the open cells (31) is open along an axial direction of the exhaust gas filter, and forms a through hole. An end part at an upstream side of each of the plugged cells (32) is plugged by a plug member. Pores are formed in the cell walls (2) which are adjacently arranged between the plugged cell and the open cell in order for exhaust gas to pass from the open cell to the plugged cell. The exhaust gas filter (1) satisfies the following: on a cross section of the exhaust gas filter, which is perpendicular to the axial direction of the exhaust gas filter, a flow passage cross sectional area S2 of the plugged cells is larger than a flow passage cross sectional area S1 of the open cells; and a total length L (i.e., a base member length L) of the exhaust gas filter (1) is not less than a second standard value L3 which is determined by the following equation (3), and is not more than a critical length Lm (i.e. an open critical length Lm) which is determined by the following equation (M), where $$L3 = -6.8 \times Rs^{1.5} + 4.5/w + 12.0/k - 189.9 \times C + 2629.1/\phi + 191.7 \quad (3), \text{ and}$$

$$Lm = -5.5 \times Rs^{1.5} - 6.0/w + 44.9/k - 234.9 \times C + 176.7/\phi + 255.6 \quad (M),$$

where w indicates a thickness (mm) of each cell wall, k indicates a permeability coefficient ($\mu m^2$) to exhaust gas, C indicates a cell density (cells/$mm^2$), $\phi$ designates an outer diameter (mm) of the exhaust gas filter, and Rs designates a flow passage cross sectional area ratio S1/S2.

In the first to third aspects of the present invention previously described, the critical length Lm (i.e. an open critical length Lm) represents the total length L of the exhaust gas filter which stops increasing of the collection ratio due to increasing of the total length L of the exhaust gas filter. The collection ratio represents a ratio of the number of particulate matter contained in exhaust gas discharged from the exhaust gas filter to the number of particulate matter contained in exhaust gas introduced into the exhaust gas. The following exemplary embodiments will explain the critical length Lm and the collection ratio.

Advantageous Effects of Invention

As previously described, the exhaust gas filter according to the first aspect to the third aspects of the present invention has the cells composed of the open cells and the plugged cells. Accordingly, this structure makes it possible to allow exhaust gas to flow and pass through the pores formed in the cell walls between the plugged cells and the open cells with high efficiency and to increase purification performance of the exhaust gas filter.

That is, because the exhaust gas filter previously described has the structure in which the flow passage cross sectional area of the plugged cells is larger than the flow passage cross sectional area, it is possible for the open cells to have a pressure loss which is larger than a pressure loss of the plugged cells. This structure makes it possible to increase a pressure difference between the pressure in the inside of the open cells and the pressure in the inside of the plugged cells. It is possible to supply the exhaust gas, which has been introduced into the open cells, from the open cells into the inside of the plugged cells with high accuracy through the by using this pressure difference, where, the pores are formed in the cell walls between the open cells and the plugged cells.

Further, the pressure difference between the open cells and the plugged cells is gradually reduced from the upstream side toward the downstream side of the exhaust gas filter. The exhaust gas enters the pores formed in the cell walls so long as the pressure difference is generated between the open cells and the plugged cells. Accordingly, as previously described, increasing the pressure difference between the open cells and the plugged cells makes it possible for exhaust gas to permeate and pass through the pores formed in the cell walls, and to collect particulate matter contained in the exhaust gas with high accuracy.

The plug member is formed in the end part at an upstream side of each of the plugged cells. This structure makes it possible to eliminate ash (such as calcium compounds, etc.) contained in exhaust gas with particulate matter from the exhaust gas filter. Because it is difficult to eliminate ash contained in exhaust gas by combustion, ash is remained and accumulated in the inside of the exhaust gas filter when plugged cells in which an end part at the downstream side of each of the plugged cell walls is plugged by the plug member.

On the other hand, in the structure of the exhaust gas filter previously described according to the present invention, ash is separated from exhaust gas when the exhaust gas passes through the cell walls, and the ash is remained in the open cells. Because the open cell is open at both end parts thereof, i.e. is a through hole, it is possible to easily eliminate ash from the open cells. This makes it possible to prevent ash from remaining in the exhaust gas filter. This makes it possible to suppress purification performance of the exhaust gas from reducing.

The exhaust gas filter according to the first aspect of the present invention has the structure previously described in which the total length L (i.e., the base member length L) is not less than the first standard value L1. This first standard value L1 is determined by the equation (1) previously described. This structure makes it possible to adequately keep the collection performance to collect particulate matter contained in exhaust gas, and to more increase the purification performance pf the exhaust gas filter.

The exhaust gas filter according to the second aspect of the present invention has the structure previously described in which the total length L (i.e., the base member length L) is not less than the second standard value L2. This second standard value L2 is determined by the equation (2) previously described. This structure makes it possible for the exhaust gas filter to provide the collection ratio of collecting particulate matter, which exceeds not less than 50% of a generally-required collection ratio of a vehicle of a gasoline engine. The exhaust gas filter having this structure can provide a high purification performance.

The exhaust gas filter according to the third aspect of the present invention has the structure previously described in which the total length L (i.e., the base member length L) is not less than the third standard value L3. This third standard value L3 is determined by the equation (3) previously described. This structure makes it possible for the exhaust gas filter to provide an adequate collection performance of collecting particulate matter contained in exhaust gas, and to increase the purification performance of the exhaust gas filter.

The exhaust gas filter according to the first aspect to the third aspect of the present invention has the total length L (i.e., the base member length L) which is not more than the critical length Lm (i.e. the stairwell critical length Lm) which is determined by the equation (M) previously described.

This the critical length Lm (i.e. the stairwell critical length Lm) represents a specific total length L of the exhaust gas filter at which the collection ratio stops increasing due to increasing of the total length L of the exhaust gas filter.

The collection ratio represents a ratio of the number of particulate matter contained in exhaust gas discharged from the exhaust gas filter to the number of particulate matter contained in exhaust gas introduced into the exhaust gas filter.

The following exemplary embodiments will explain the critical length Lm and the collection ratio. This structure makes it possible to suppress the pressure loss of the exhaust gas filter from increasing and the size of the exhaust gas filter from increasing. That is, because open flow phenomenon of exhaust gas occurs when the total length L (i.e., the base member length L) of the exhaust gas filter becomes more than the critical length Lm, where the exhaust gas only passes through the open cells without passing through the pores formed in the cell walls.

This causes waste of pressure loss and mountability of the exhaust gas filter mounted on a vehicle. It is accordingly possible to efficiently suppress the pressure loss of the exhaust gas filter and the size of the exhaust gas filter from increasing when the total length L (i.e., the base member length L) of the exhaust gas filter is not less than the critical length Lm.

As previously described, the present invention provides the exhaust gas filter having the improved structure capable of suppressing the pressure loss from increasing, the mountability of a vehicle from reducing, and capable of increasing the collection performance of collecting particulate matter contained in exhaust gas, and of improving the purification performance of the exhaust gas filter.

BRIEF DESCRIPTION OF DRAWINGS

FIG. 8 is a view showing an exhaust gas filter according to a fourth exemplary embodiment of the present invention.

FIG. 9 is a view explaining a shape of an exhaust gas filter used by a first recognition test according to the present invention.

DESCRIPTION OF EMBODIMENTS

Figure 1:
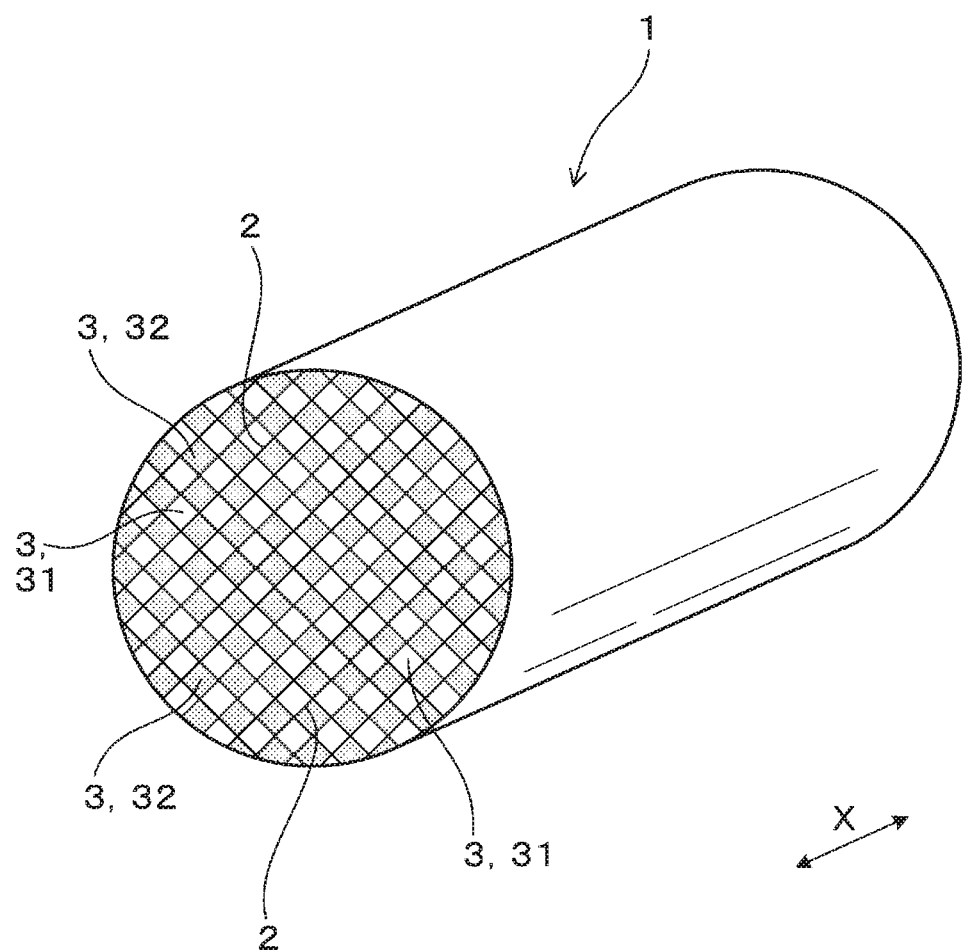
FIG. 1 is a view showing an exhaust gas filter according to a first exemplary embodiment of the present invention.

Next, a description will be given of the exhaust gas filter according to preferred exemplary embodiments.

The exhaust gas filter previously described has the flow passage cross sectional area ratio $Rs=S2/S1$ which is within a range of $1.1 \leq Rs \leq 5$, and has the base member length L which is within a range of 35 mm $\leq L \leq$ 270 mm (the following explanation will use the base member length L which also corresponds to the total length L of the exhaust gas filter), where S1 indicates a flow passage cross sectional area of the open cells, S2 indicates a flow passage cross sectional area of the plugged cells, and the flow passage cross sectional area ratio Rs is a ratio of S2 to S1. This structure of the exhaust gas filter makes it possible to reliably generate a pressure difference between the open cells and the plugged cells so as for exhaust gas to reliably pass through the pores formed in the cell walls between the open cells and the plugged cells.

In addition, because the exhaust gas filter has the structure in which the base member length L is determined within a range of 35 mm to 270 mm which corresponds to the flow passage cross sectional area ratio Rs between the plugged cells and the open cells, it is possible to improve the collection performance of the exhaust gas filter while effectively suppressing the pressure loss of the exhaust gas filter from increasing.

Because the pressure difference is reduced when the exhaust gas filter has the flow passage cross sectional area ratio Rs of less than 1.1, the permeating amount of exhaust gas passing through the cell walls is reduced, an there is a possible case in which the exhaust gas filter cannot provide an adequate purification performance.

Further, because the flow passage cross sectional area ratio Rs exceeds 5, there is a tendency in which an area of the cell walls forming the open cells is easily reduced, i.e., a filtration area is easily reduced. This causes that the pressure loss drastically increases when a large amount of particulate matter is collected in the cell walls and the cells are clogged.

It is more preferable for the exhaust gas filter to have the flow passage cross sectional area ratio Rs within a range of $1.1 \leq Rs \leq 2.5$.

When the exhaust gas filter has the flow passage cross sectional area ratio Rs of more than 2.5, there is a possible case in which the exhaust gas filter has an excess pressure loss. Accordingly, there is a possible case in which the improved collection performance is reduced dues to increasing of the pressure loss when the base member length becomes long.

Further, when the exhaust gas filter has the base member length L of less than 35 mm, because this base member length of the exhaust gas filter becomes short in view of the base member diameter, there is a possible case in which it becomes difficult to mount the exhaust gas filter to an exhaust gas pipe of the internal combustion engine.

Still further, when the exhaust gas filter has the base member length L of more than 270 mm, a specific area is generated, which has no pressure difference between the open cells and the plugged cells because exhaust gas passes through the cells. Accordingly, it is more preferable for the exhaust gas filter to have the base member length L which is within a range of 55 mm≤L≤220 mm.

When the base member length L is less than 55 mm, there is a possible case in which the performance of the exhaust gas filter is reduced because of generating open-flow phenomenon of exhaust gas is generated, in which the exhaust gas passes through the open cells without passing through the pores formed between the open cells and the plugged cells.

Further, when the base member length L exceeds 220 mm, this often easily reduces the collection performance even if the base member length L is increased. Still further, when the base member length L is more than 220 mm, there is a possible increasing of the pressure loss of the exhaust gas filter.

The cells have a structure composed of octagonal cells and rectangular cells. An inner periphery of the octagonal cell has an octagonal shape. An inner periphery of the rectangular cell has a rectangular shape. It is preferable that a hydraulic diameter of the octagonal cell is larger than a hydraulic diameter of the rectangular cells, and the octagonal cells and the rectangular cells are alternately arranged. This structure makes it possible to increase a difference in hydraulic diameter between the octagonal cell and the rectangular cell. It is further possible to arrange the plugged cells and the open cells adjacently to each other when the octagonal cells are used as the plugged cells and the rectangular cells are used as the open cells. This makes it possible to increase the pressure difference between the plugged cells and the open cells with high effectively.

On the other hand, when the plugged cells are arranged adjacently to each other or the open cells are arranged adjacently to each other, the exhaust gas filter has a low collection performance of collecting particulate matter contained in exhaust gas because this arrangement of the plugged cells and the open cells has a low pressure loss. In addition, it is preferable for the cells to have a shape of a large hydraulic diameter in view of the pressure loss of the exhaust gas filter. Accordingly, a cross section of a cell having a triangular shape, etc. would cause increasing of the pressure loss of the exhaust gas filter. It is therefore possible to increase the exhaust gas purification performance of the exhaust gas filter with high efficiency when the octagonal cells and the rectangular cells are alternately arranged.

Although the present invention does not limit the porosity of the cell walls, it is preferable for the cell walls to have a porosity within a range of 50 to 80%, and more preferable to have the porosity within a range of 50 to 65%. When the porosity is less than 50%, it becomes difficult for exhaust gas containing particulate matter to pass through the cell walls (i.e., a permeation amount of exhaust gas through the cell walls becomes easily reduced.) Further, an amount of exhaust gas containing particulate matter passing through the cell walls is easily reduced, and the collection performance of collecting particulate matter is also easily reduced.

When the porosity is more than 65%, a strength of the exhaust gas filter easily reduces, and this causes difficult to mount the exhaust gas filter onto an exhaust gas pipe. It is possible to detect the porosity of the cell walls in the exhaust gas filter by using a mercury porosimeter.

Although the present invention does not limit an average pore diameter (or an average pore size), it is preferable for the cell walls to have an average pore diameter within a range of 5 to 30 μm, and more preferable to have an average pore diameter within a range of 10 to 25 μm. If the cell walls have the average pore diameter of less than 10 μm, it becomes difficult for exhaust gas containing particulate matter to permeate and pass through the cell walls (i.e. a permeate coefficient of exhaust gas to pass through the cell walls is easily reduced).

Accordingly, this makes it possible for a permeating amount of exhaust gas, containing particulate matter to pass through the cell walls, to be reduced, and for the collection performance of the exhaust gas filter to be easily reduced.

If the cell walls have the average pore diameter of more than 25 μm, the strength of the exhaust gas filter easily reduces, and this causes difficult to mount the exhaust gas filter onto an exhaust gas pipe. It is possible to detect the porosity of the cell walls in the exhaust gas filter by using a mercury porosimeter.

It is preferable for the exhaust gas filter to have the cell walls having a thickness w (mm) within a range of $0.10 \leq w \leq 0.50$, and more preferable to have the cell walls having a thickness w (mm) within a range of $0.13 \leq w \leq 0.47$. If the thickness of the cell walls is less than 0.13 mm, the strength of the exhaust gas filter easily reduces, and this makes it difficult to mount the exhaust gas filter onto an exhaust gas pipe. If the thickness of the cell walls is more than 0.47 mm, it becomes difficult for exhaust gas containing particulate matter to permeate and pass through the cell walls. Accordingly, this makes it possible for the permeating amount of exhaust gas, containing particulate matter to pass through the cell walls, to be reduced, and for the collection performance of the exhaust gas filter to be reduced.

It is preferable for the cells in the exhaust gas filter have a cell density (cells/mm$^2$) within a range of $0.30 \leq C \leq 0.70$, and more preferable for the exhaust gas filter have the cell density (cells/mm$^2$) within a range of $0.31 \leq C \leq 0.62$.

When the cells in the exhaust gas filter has the cell density of less than 0.31 (cells/mm$^2$), the pressure difference between the plugged cells and the open cells forming the cells easily becomes small, and it becomes difficult for exhaust gas containing particulate matter to permeate in the cell walls. As a result, the exhaust gas filter having this structure easily reduces its collection performance.

When the cells in the exhaust gas filter has the cell density of more than 0.62 (cells/mm$^2$), the cells have an excessively reduced hydraulic diameter, and the pressure loss of the exhaust gas filter would increase.

It is preferable for the exhaust gas filter to have an outer diameter $\phi$ (mm) within a range of $60 \leq \phi \leq 160$, and more preferable to have the outer diameter $\phi$ (mm) within a range of $80 \leq \phi \leq 150$.

When the exhaust gas filter has the outer diameter $\phi$ (mm) of less than 80 mm, because the overall area of the flow passage is reduced, there is a possible case in which the pressure loss of the exhaust gas filter increases.

When the exhaust gas filter has the outer diameter $\phi$ (mm) of more than 150 mm, there is a possible case in which the mountability of the exhaust gas filter to a vehicle is reduced.

It is preferable for the cell walls of the exhaust gas filter to have the permeability coefficient k ($\mu m^2$) to exhaust gas within a range of $0.1 \leq k \leq 2.0$, and more preferable to have the permeability coefficient k ($\mu m^2$) to exhaust gas with a range of $0.3 \leq k \leq 1.1$. It is known that the porosity and the average pore diameter strongly affect the permeability coefficient k ($\mu m^2$) to exhaust gas in the cell walls, and the permeability coefficient k ($\mu m^2$) to exhaust gas strongly vary due to the variation of the porosity and the average pore diameter of the cell walls.

When the permeability coefficient k ($\mu m^2$) to exhaust gas is less than 0.3 $\mu m^2$, the porosity and the average pore diameter of the cell walls easily become small, and it becomes difficult for exhaust gas containing particulate matter to pass through the cell walls, and the collection performance of the exhaust gas filter is reduced. Still further, the strength of the exhaust gas filter is easily reduced by this structure.

(First Exemplary Embodiment)

A description will be given of an exhaust gas filter 1 according to the first exemplary embodiment with reference to FIG. 1 to FIG. 3.

Figure 2:
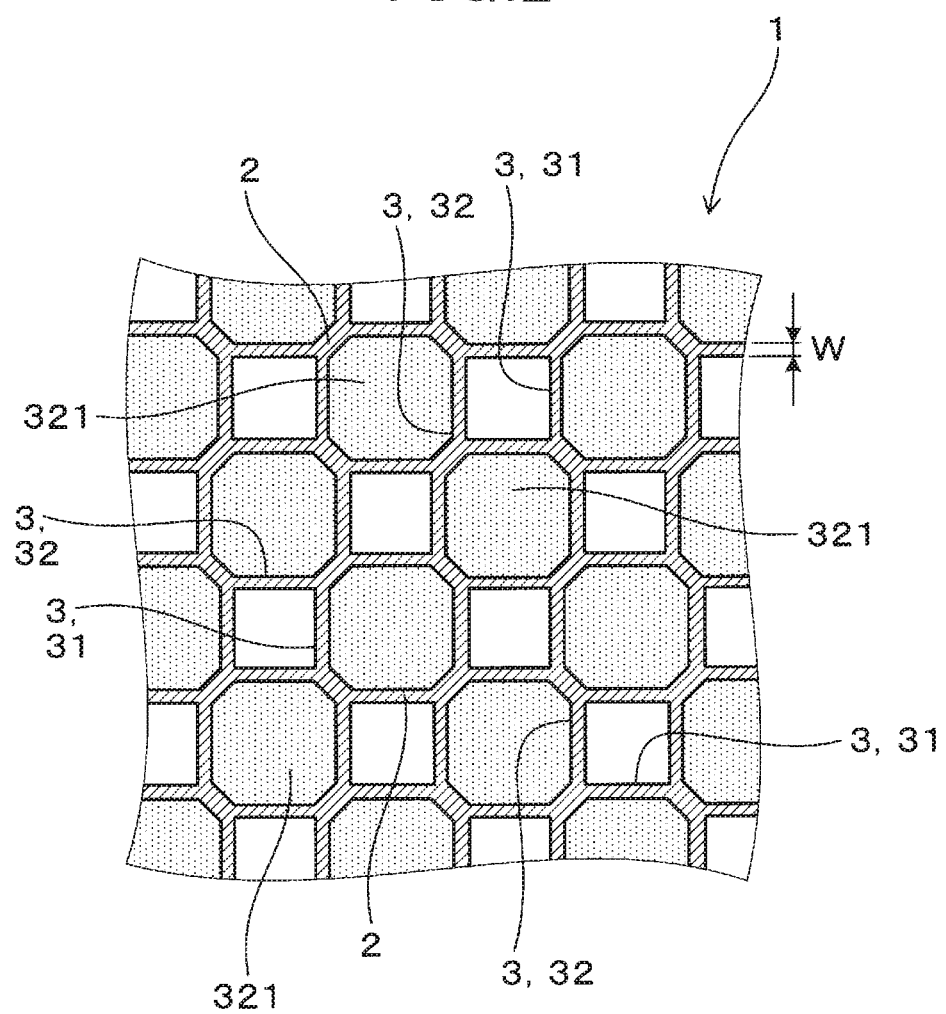
FIG. 2 is a view showing a cross section along the II-II line shown in FIG. 1.
Figure 3:
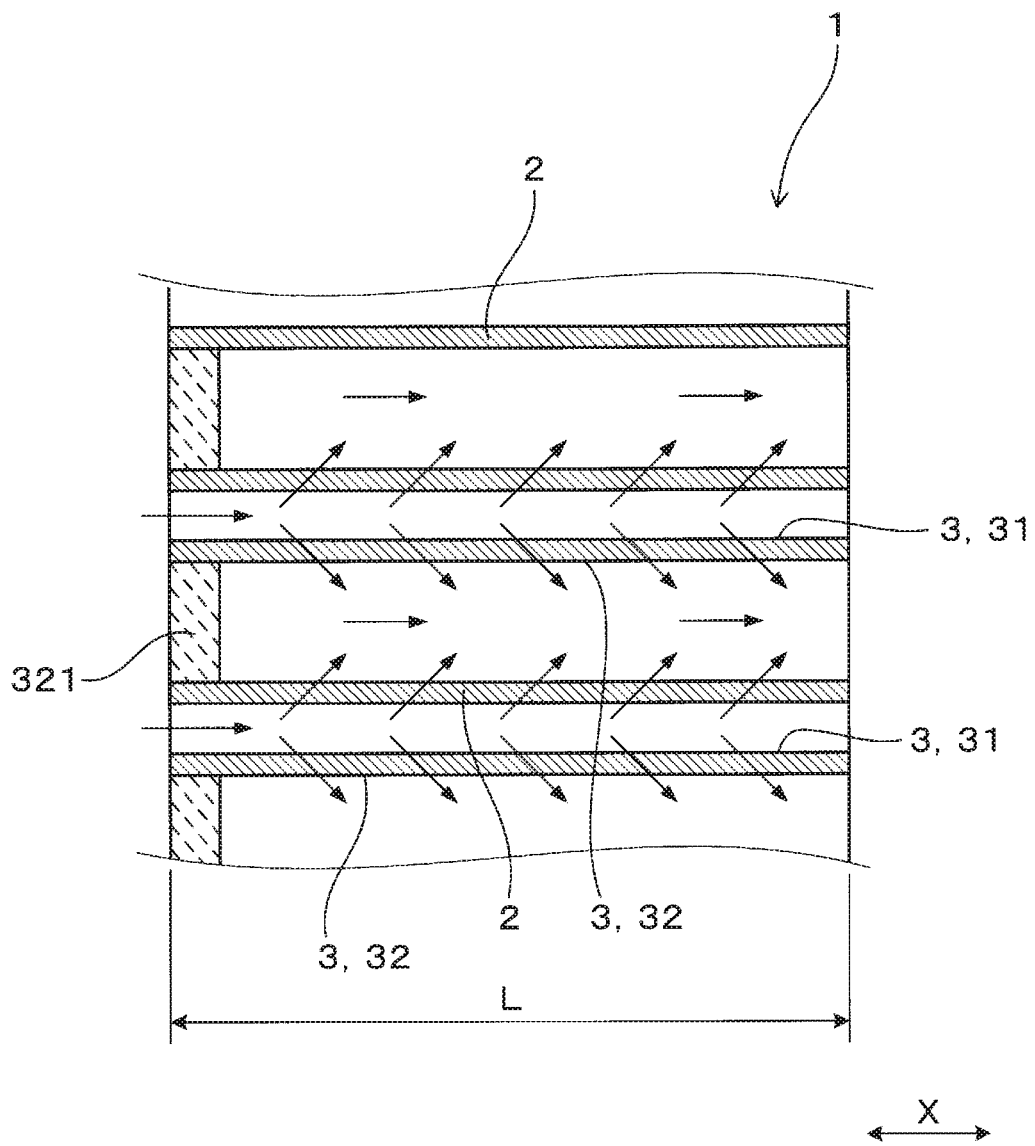
FIG. 3 is a view showing a cross section along the III-III line shown in FIG. 2.

As shown in FIG. 1 to FIG. 3, the exhaust gas filter 1 is capable of purifying exhaust gas containing particulate matter emitted from an internal combustion engine. The exhaust gas filter 1 has a plurality of cell walls 2 and a plurality of cells 3. Each of the cells 3 is surrounded by the cell walls 2.

Pores are formed in the cell walls 2 so as to allow communicate between the cells 3 which are formed adjacently to each other. The cells 3 are composed of open cells 31 and plugged cells 32. Each of the open cells 31 is an open through hole formed along an axial direction X of the exhaust gas filter 1. Both end parts of each of the open cells 31 are open and are not plugged by plug members. An end part, at the upstream side in the axial direction X, of each of the plugged cells is plugged by the plug member. On a cross section, which is perpendicular to the axial direction X of the exhaust gas filter 1, a flow passage cross sectional area of the plugged cells 32 is larger than a flow passage cross sectional area of the open cells 31.

A description will now be given of the exhaust gas filter 1 according to the first exemplary embodiment in detail. As shown in FIG. 1, the exhaust gas filter 1 according to the instant exemplary embodiment purifies exhaust gas emitted from an internal combustion engines such as diesel engines and gasoline engines mounted on a vehicles.

The exhaust gas filter 1 has a cylindrical shape. In the exhaust gas filter 1, the cell walls 2 are arranged in a lattice shape and each of the cells 3 is surrounded by the cell walls 2. The exhaust gas filter 1 has an outer diameter $\phi$ of 132 mm. It is preferable for the exhaust gas filter 1 according to the first exemplary embodiment to have the base member length L within a range of 35 mm $\leq$ L $\leq$ 270 mm.

The cell walls 2 are made of ceramic material having a porous structure. In the cell walls 2, pores (not shown) are formed so as to communicate between the cells 3 together, which are adjacently arranged. The first exemplary embodiment uses, as the ceramic material, cordierite having an average particle diameter of 18 $\mu m$ and a porosity of 60%. Each of the cell walls 2 has a thickness W of 0.28 mm. The exhaust gas filter 1 according to the first exemplary embodiment has a permeability coefficient k ($\mu m^2$) to exhaust gas of 0.7 $\mu m^2$. The permeability coefficient k represents a degree for exhaust gas to easily permeate the cell walls 2.

As shown in FIG. 1 to FIG. 3, the cells 3 are composed of open cells 31 and plugged cells 32. The open cells 31 and the plugged cells 32 are alternately arranged so as to be adjacently each other. The exhaust gas filter 1 according to the first exemplary embodiment has a cell density C of 0.47 cells/mm$^2$ which represents the number of the cells 3 in unit area (mm$^2$).

As shown in FIG. 1 to FIG. 3, the plural cells 3 have two types of shapes. That is, the plural cells 3 contain not less than two different types of cells 3 when viewed along the axial direction X of the exhaust gas filter 1. In the following explanation of the exemplary embodiments, the different types of cells 3 contain cells 3 which are different in size, but similar. In the first exemplary embodiment, the cells 3 are composed of octagonal cells 3 and rectangular cells 3. The inner periphery of each of the octagonal cells 3 has an octagonal shape. The inner periphery of each of the rectangular cells 3 has a rectangular shape.

The octagonal cell 3 has a hydraulic diameter which is larger than a hydraulic diameter of the rectangular cell 3. The exhaust gas filter 1 has the octagonal cells 3 and the rectangular cells 3 which are alternately arranged. In the exhaust gas filter 1 according to the first exemplary embodiment, the octagonal cells 3 having the inner periphery of an octagonal shape correspond to the plugged cells 32. On the other hand, the rectangular cells 3 having the inner periphery of a rectangular shape correspond to the open cells 31. That is, the plugged cells 32 have the hydraulic diameter which is larger than the hydraulic diameter of the open cells 31.

The open cell 31 has a square shape when viewed in the axial direction X of the exhaust gas filter 1. The open cell 31 is open along the axial direction, i.e. has a through-hole shape without any plug member. The exhaust gas can pass through the open cells 31. On the other hand, the plugged cell 32 has an octagonal shape when viewed in the axial direction X of the exhaust gas filter 1. An end part at the upstream side of the plugged cell 31 is plugged by the plug member 321.

The exhaust gas filter 1 according to the first exemplary embodiment has the structure in which a flow passage cross sectional area S2 of the plugged cells 32 is larger than a flow passage cross sectional area S1 of the open cells 31. That is, the exhaust gas filter 1 according to the first exemplary embodiment has a flow passage cross sectional area ratio Rs=S2/S1 within a range of 1.1≤Rs≤5. The flow passage cross sectional area ratio Rs is a ratio of the flow passage cross sectional area S2 of the plugged cells 32 to the flow passage cross sectional area S1 of the open cells 31. Further, the exhaust gas filter 1 according to the first exemplary embodiment has the flow passage cross sectional area ratio Rs of 1.6 (Rs=1.6).

The exhaust gas filter 1 has a total length L which is not less than a first standard value L1 determined by the following equation (1), and not more than a critical length Lm determined by the following equation (M).

$$L1=-3.7 \times Rs^{1.5}-3.6/w+9.7/k-152.9 \times C+2241.5/\phi+145.1 \quad (1), \text{ and}$$

$$Lm=-5.5 \times Rs^{1.5}-6.0/w+44.9/k-234.9 \times C+176.7/\phi+255.6 \quad (M),$$

where w indicates a thickness (mm) of each cell wall 2, k indicates a permeability coefficient ($\mu m^2$) to exhaust gas, C indicates a cell density (cells/$mm^2$), $\phi$ designates an outer diameter (mm) of the exhaust gas filter 1.

A description will now be given of the explanation of the equation 81) with reference to FIG. 5.

Figure 5:
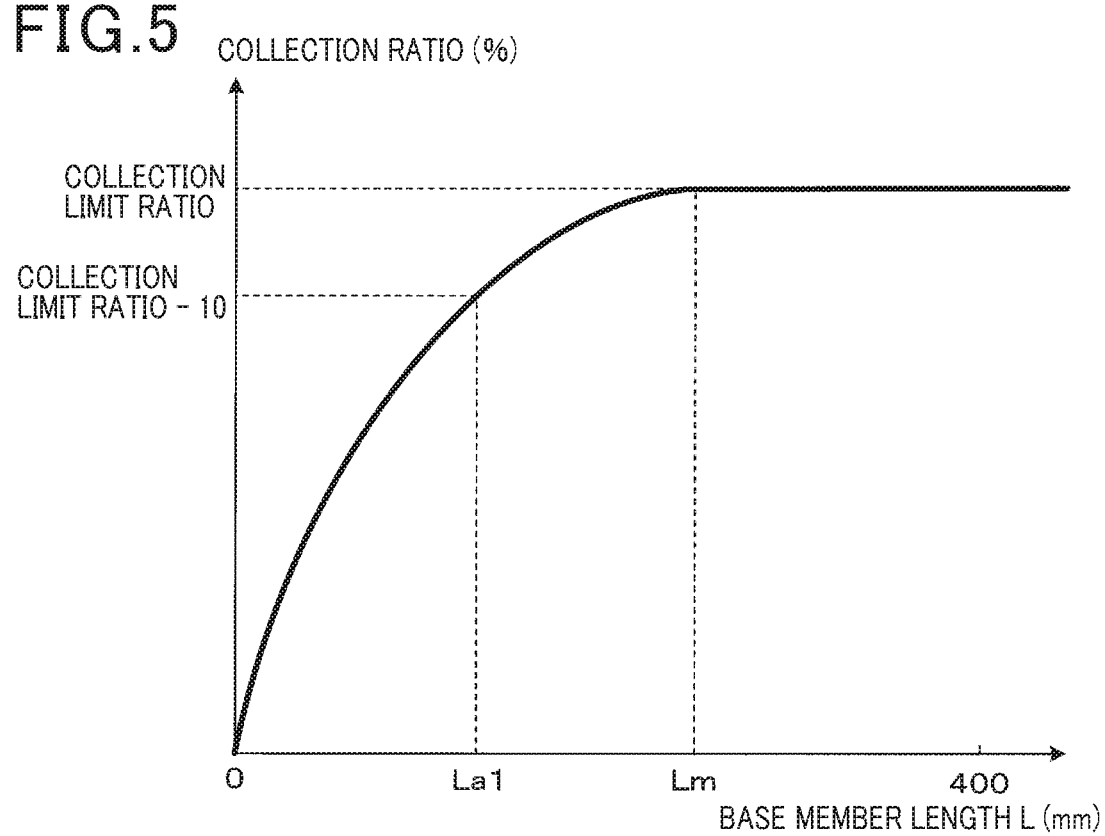
FIG. 5 is a graph showing a schematic relationship between a base member length, i.e. a total length and a collection ratio of the exhaust gas filter according to the first exemplary embodiment.

FIG. 5 is a view showing a schematic relationship between the base member length L and the collection ratio of the exhaust gas filter 1. This collection ratio represents a ratio of the number of particulate matter contained in exhaust gas discharged from the exhaust gas filter 1 to the number of particulate matter contained in exhaust gas introduced into the exhaust gas filter 1.

As shown in FIG. 5, the longer the base member length L (i.e. the total length L) is, the higher the collection ratio is. When the base member length L of the exhaust gas filter 1 exceeds the specific length, the collection ratio stops increasing even if the base member length L increases. This means that exhaust gas, which has been introduced from the upstream side into the open cells 31 does not pass through the cell walls 2 from a specific position at the downstream side, and the exhaust gas passes through the open cells 31 and is discharged from the end part of the open cells 31 to outside of the exhaust gas filter 1. The exemplary embodiments use a collection limit ratio which is not less than a critical length Lm. This critical length Lm (i.e. an open critical length Lm) represents the specific total length of the exhaust gas filter at which the collection ratio stops increasing due to increasing of the total length L of the exhaust gas filter. That is, the collection ratio of the exhaust gas filter 1 does not increase more than the collection limit ratio even if the base member length L is increased more than the critical length Lm. For this reason, the base member length L of the exhaust gas filter 1 is not more than the critical length Lm in view of reduction of the pressure loss and suppression of upsizing of the exhaust gas filter 1.

The exhaust gas filter 1 according to the first exemplary embodiment has the base member length L which has approached as long as the critical length Lm so as to obtain high purification performance of purifying exhaust gas. In addition to this, the exhaust gas filter 1 according to the first exemplary embodiment has the base member length L which is not more than the critical length Lm so as to reduce the pressure loss and the total size of the exhaust gas filter 1, as previously described.

As shown in FIG. 5, the first exemplary embodiment uses the first standard value L1 determined by the following equation (1), which is the same as the minimum value (La1) of the base member length L when the collection ratio becomes not less than a value obtained by subtracting a value of 10% from the collection limit ratio.

When the collection limit ratio is 70%, the base member length having the collection ratio of 60% is used as the base member length La1 which corresponds to the first standard value L1.

Because the first exemplary embodiment provides the exhaust gas filter having the base member length L which is not less than the first standard value L1 and not more than the critical length Lm, it is possible for the exhaust gas filter 1 to have the high purification performance while reducing the pressure loss and the total size of the exhaust gas filter 1.

The use of the equation (1) and the equation (M) affects the value of the collection limit ratio. In order to obtain the collection limit ratio, the second exemplary embodiment executed multiple regression analysis by using an analysis software program JUSE-Start Works (Japanese registered Trademark) which uses variables such as the flow passage cross sectional area ratio Rs, the thickness w of the cell walls 2, the permeability coefficient k, the cell density C, and the outer diameter $\phi$ of the exhaust gas filter 1.

The exhaust gas filter 1 according to the first exemplary embodiment has the first standard value L1 of 84 mm and the critical length Lm of 178 mm when the flow passage cross sectional area ratio Rs is 1.6, the thickness w of the cell walls 2 is 0.28 mm, the cell density C is 0.47 (cells/$mm^2$), the permeability coefficient k is 0.7 $\mu m^2$ and the outer diameter $\phi$ is 132.0 mm. The exhaust gas filter 1 according to the first exemplary embodiment has the base member length L which is not less than the first standard value L1 and not more than the critical length Lm.

A description will now be given of the action and effects of the exhaust gas filter 1 according to the first exemplary embodiment. As previously described, the exhaust gas filter 1 has the cells 3 composed of the open cells 31 and the plugged cells 32. This structure of the exhaust gas filter 1 makes it possible for exhaust gas to pass through the pores formed in the cell walls 2 with high efficiency, and to increase the purification performance of purifying exhaust gas.

That is, the pressure loss of the open cells 31 becomes larger than the pressure loss of the plugged cells 32 and a pressure difference between the inside pressure of the open cells 31 and the inside pressure of the plugged cells 32 increases when the open cells 31 and the plugged cells 32 are formed so that the flow passage cross sectional area ratio Rs of the plugged cells 32 becomes larger than the flow passage cross sectional area ratio Rs of the open cells 31.

It is possible to supply exhaust gas introduced to the inside of the open cells 31 to the plugged cells 32 through the pores formed in the cell walls with high efficiency by using the pressure difference.

Further, it is possible to more increase the pressure difference between the inside pressure of the open cells 31 and the inside pressure of the plugged cells 32 when increasing the difference in flow passage cross sectional area between the open cells 31 and the plugged cells 32. This structure makes it possible to supply a large amount of exhaust gas to the inside of the plugged cells 32 through the cell walls 2.

Further, although the pressure difference between the open cells 31 and the plugged cells 32 is reduced from the upstream side toward the downstream side of the exhaust gas filter 1, it is possible to continue the penetration of exhaust gas into the pores so long as the pressure difference between the open cells 31 and the plugged cells 32 is generated. Accordingly, as previously described, it is possible for exhaust gas to penetrate into the cell walls 2 along the wide range of the exhaust gas filter 1 by increasing the pressure difference between the open cells 31 and the plugged cells 32. It is therefore possible for the exhaust gas filter 1 to trap and collect particulate matter contained in exhaust gas with high efficiency.

Further, the plug member 321 is formed in the end part at the upstream side of the plugged cells 32. This structure makes it possible to discharge ash (such as calcium compounds, etc.) contained in exhaust gas with particulate matter from the exhaust gas filter 1. Because it is difficult to eliminate ash by combustion, ash is accumulated inside of an exhaust as filter having a structure in which the plug member is formed in an end part at the downstream side of the plugged cells.

On the other hand, in the structure of the exhaust gas filter 1 according to the first exemplary embodiment, ash is separated from exhaust gas by the cell walls 2 when exhaust gas penetrates and passes through the cell walls 2, and ash is remained and accumulated in the inside of the open cells 31. Because the open cells 31 are through holes, i.e. open along the axial direction of the exhaust gas filter 1, it is possible to easily discharge ash from the open cells 31, and to prevent ash from remaining in the inside of the open cells 31. This makes it possible to suppress deterioration of the purification performance of the exhaust gas filter 1.

The exhaust gas filter 1 has the base member length, i.e. the total length which is not less than the first standard value L1 determined by the equation (1) previously described. This structure makes it possible to provide the adequate collection performance of collecting particulate matter contained in exhaust gas, and to improve the purification performance of the exhaust gas filter 1.

Further, the exhaust gas filter 1 has the base member length which is not more than the critical length Lm determined by the equation (M) previously described. This structure makes it possible to effectively suppress the pressure loss of the exhaust gas filter 1 from increasing and the size of the exhaust gas filter 1 from increasing. That is, because open-flow phenomenon of exhaust gas occurs when the base member length L of the exhaust gas filter becomes more than the critical length Lm, where the exhaust gas only passes through the open cells without passing through the pores formed in the cell walls. This causes waste of the pressure loss and mountability of the exhaust gas filter mounted on a vehicle. It is accordingly possible to efficiently suppress the pressure loss of the exhaust gas filter 1 and the size of the exhaust gas filter 1 from increasing when the base member length L of the exhaust gas filter is not less than the critical length Lm.

The exhaust gas filter 1 has the flow passage cross sectional area ratio Rs within the range of $1.1 \leq Rs \leq 5$ and has the base member length L within the range of 35 mm$\leq$L$\leq$270 mm. This structure of the exhaust gas filter makes it possible to reliably generate a pressure difference between the open cells 31 and the plugged cells 32 so as for exhaust gas to reliably pass through the pores formed in the cell walls 2 between the open cells 31 and the plugged cells 32. Further, because the exhaust gas filter 1 has the structure in which the base member length L is determined within the range of 35 mm to 270 mm which corresponds to the flow passage cross sectional area ratio Rs between the plugged cells 32 and the open cells 31, it is possible to improve the collection performance of the exhaust gas filter 1.

In addition, the exhaust gas filter 1 according to the present exemplary embodiment has the base member length, i.e. the total length which is not less than the first standard value L1 determined by the equation (1). This makes it possible to maintain the adequate collection performance of collecting particulate matter contained in exhaust gas, and to improve the purification performance of the exhaust gas filter 1.

In the exhaust gas filter 1 according to the first exemplary embodiment, the plural cells 3 have two types of shapes. This structure makes it possible to easily obtain the plugged cells 32 having the flow passage cross sectional area S2 which is larger than the flow passage cross sectional area S1 of the open cells 31.

The cells 3 have a structure composed of the octagonal cells 3 and the rectangular cells 3. An inner periphery of the octagonal cell 3 has an octagonal shape. An inner periphery of the rectangular cell 3 has a rectangular shape. The hydraulic diameter of the octagonal cell 3 is larger than the hydraulic diameter of the rectangular cell 3, and the octagonal cells 3 and the rectangular cells 3 are alternately arranged. This structure makes it possible to increase a difference in hydraulic diameter between the octagonal cell 3 and the rectangular cell 3. It is further possible to arrange the plugged cells 32 and the open cells 31 adjacently to each other when the octagonal cells are used as the plugged cells 32 and the rectangular cells are used as the open cells 31. This arrangement structure makes it possible to increase the pressure difference between the plugged cells 32 and the open cells 31 with high effectively. This structure makes it possible to further reduce the size of the cell walls 2 formed between the octagonal cells, through which no exhaust gas flows. This makes it possible to improve the purification performance of the exhaust gas filter 1.

As previously described, it is possible for the first exemplary embodiment to provide the exhaust gas filter 1 having improved collection performance of collecting particulate matter contained in exhaust gas and increasing the purification performance while suppressing the pressure loss from increasing and the mountability to vehicles from reducing.

Figure 4:
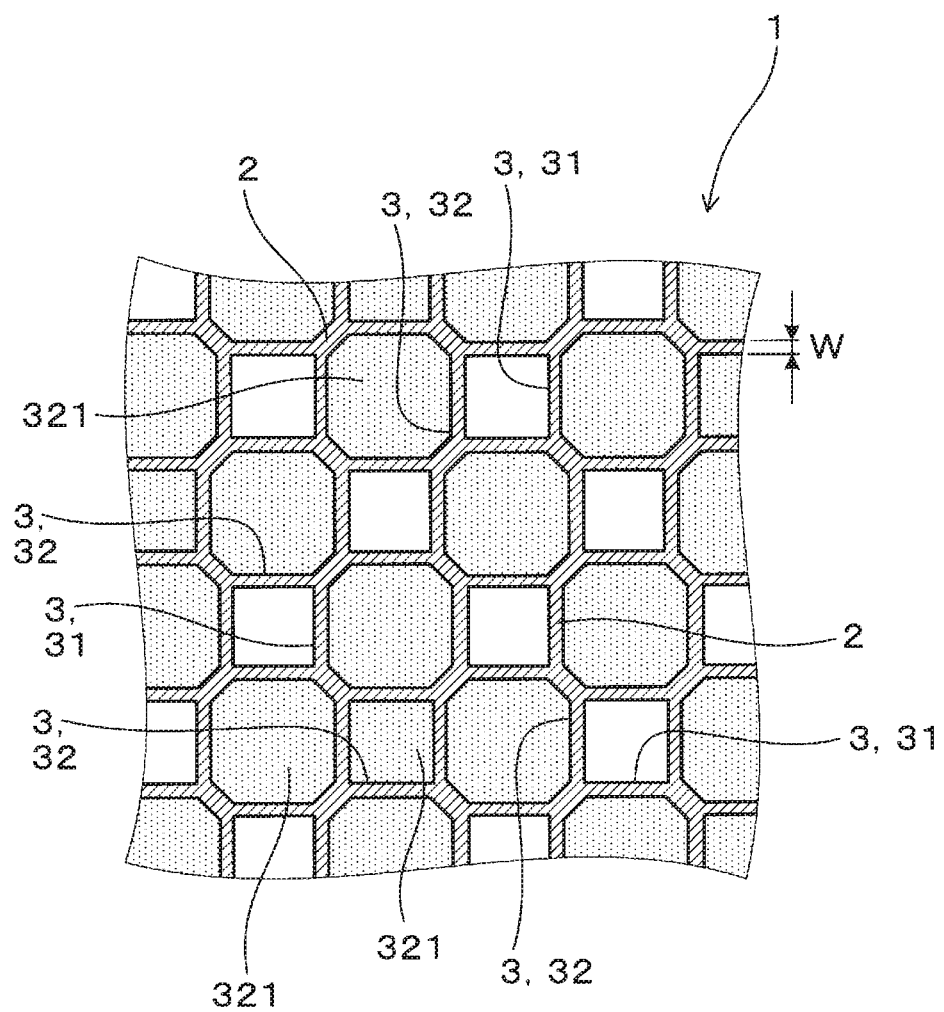
FIG. 4 is a view explaining an example of the exhaust gas filter according to the first exemplary embodiment of the present invention.

As previously described, the exhaust gas filter 1 according to the first exemplary embodiment has the structure in which the rectangular cells 3 are used as the open cells 31 and the octagonal cells 3 are used as the plugged cells 32, and the open cells 31 and the plugged cells 32 are alternately arranged. The concept of the present invention is not limited by this structure. For example, as shown in FIG. 4, it is acceptable to use a part of the rectangular cells 3 as the plugged cells 32. This structure also makes it possible to have the same action and effects of the exhaust gas filter 1 according to the first exemplary embodiment.

(Second Exemplary Embodiment)

A description will be given of the exhaust gas filter according to the second exemplary embodiment.

The exhaust gas filter 1 according to the second exemplary embodiment has the base member length, i.e. the total length which is different from the base member length of the exhaust gas filter 1 according to the first exemplary embodiment. The base member length, i.e. the total length of the exhaust gas filter according to the second exemplary embodiment is determined by the equation (2). Other structure of the exhaust gas filter 1 according to the second exemplary embodiment is the same as the structure of the exhaust gas filter 1 according to the first exemplary embodiment.

The second exemplary embodiment provides the exhaust gas filter 1 having the base member length L which is not less than the second standard value L2 determined by the following equation (2), and not more than the critical length Lm (i.e. the stairwell critical length Lm) determined by the equation (M) previously described.

$$L2=-13.4\times Rs^{1.5}+0.76/w+3.2/k-132.1\times C+1117.3/\phi+174.4 \qquad (2).$$

Figure 6:
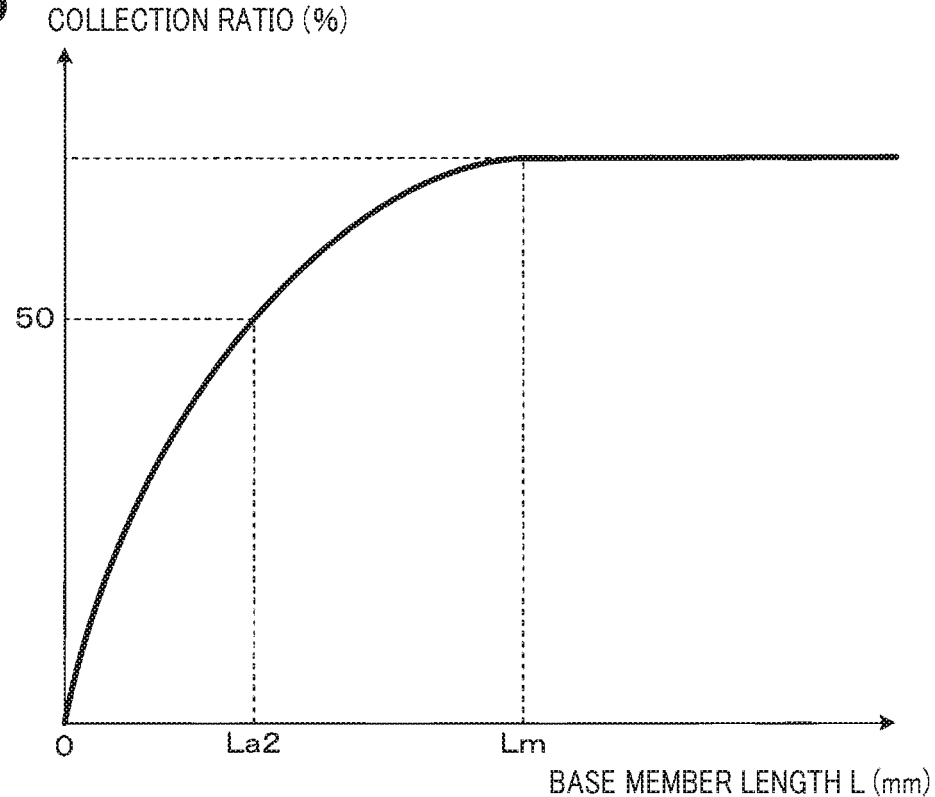
FIG. 6 is a graph showing a schematic relationship between the base member length, i.e. the total length of the exhaust gas filter and the collection ratio of the exhaust gas filter according to a second exemplary embodiment.

FIG. 6 is a view showing a schematic relationship between the base member length L and the collection ratio, which is similar to the relationship shown in FIG. 5. As shown in FIG. 6, the second exemplary embodiment uses the second standard value L2 determined by the equation (2), which is the same as the minimum value (La2) of the base member length L when collection ratio becomes not less than 50%. Because the second exemplary embodiment produces the exhaust gas filter having the base member length L which is not less than the second standard value L2 and not more than the critical length Lm, it is possible for the exhaust gas filter 1 to obtain the collection ratio of not less than 50% while reducing the pressure loss and the total size of the exhaust gas filter.

The use of the equation (2) affects the value of the collection limit ratio. In order to obtain the collection limit ratio, the second exemplary embodiment executed multiple regression analysis by using variables such as the flow passage cross sectional area ratio Rs, the thickness w of the cell walls 2, the permeability coefficient k, the cell density C, and the outer diameter $\phi$ of the exhaust gas filter 1.

The exhaust gas filter 1 according to the second exemplary embodiment has the second standard value L2 of 101 mm and the critical length Lm of 178 mm, as previously described, when the flow passage cross sectional area ratio Rs is 1.6, the thickness w of the cell walls 2 is 0.28 mm, the cell density C is 0.47 (cells/mm$^2$), the permeability coefficient k is 0.7 $\mu$m$^2$ and the outer diameter $\phi$ is 132.0 mm. The exhaust gas filter 1 according to the second exemplary embodiment has the base member length L which is not less than the second standard value L2 and not more than the critical length Lm.

The exhaust gas filter 1 according to the second exemplary embodiment has the structure, other than the above specific structure, which is the same as the structure of the exhaust gas filter 1 according to the first exemplary embodiment.

The same components between the exhaust gas filter 1 according to the second exemplary embodiment and the exhaust gas filter 1 according to the first exemplary embodiment are designated by using the same reference characters and numbers.

The exhaust gas filter 1 according to the second exemplary embodiment has a collection ratio of not less than 50% which exceeds a commonly requested collection ratio for vehicles of gasoline engines. Further, the exhaust gas filter 1 according to the second exemplary embodiment has the same action and effects of the exhaust gas filter 1 according to the first exemplary embodiment.

(Third Exemplary Embodiment)

A description will be given of the exhaust gas filter according to the third exemplary embodiment.

The exhaust gas filter 1 according to the third exemplary embodiment has the base member length, i.e. the total length which is different from the base member length of the exhaust gas filter 1 according to the first exemplary embodiment. The base member length, i.e. the total length of the exhaust gas filter according to the third exemplary embodiment is determined by the equation (3). Other structure of the exhaust gas filter 1 according to the third exemplary embodiment is the same as the structure of the exhaust gas filter 1 according to the first exemplary embodiment.

The third exemplary embodiment provides the exhaust gas filter 1 having the base member length L which is not less than the third standard value L3 determined by the following equation (3), and not more than the critical length Lm (i.e. the stairwell critical length Lm) determined by the equation (M) previously described.

$$L3=-6.8\times Rs^{1.5}+4.5/w+12.0/k-189.9\times C+2629.1/\phi+191.7 \qquad (3).$$

A description will now be given of the explanation of the equation (3) with reference to FIG. 7.

Figure 7:
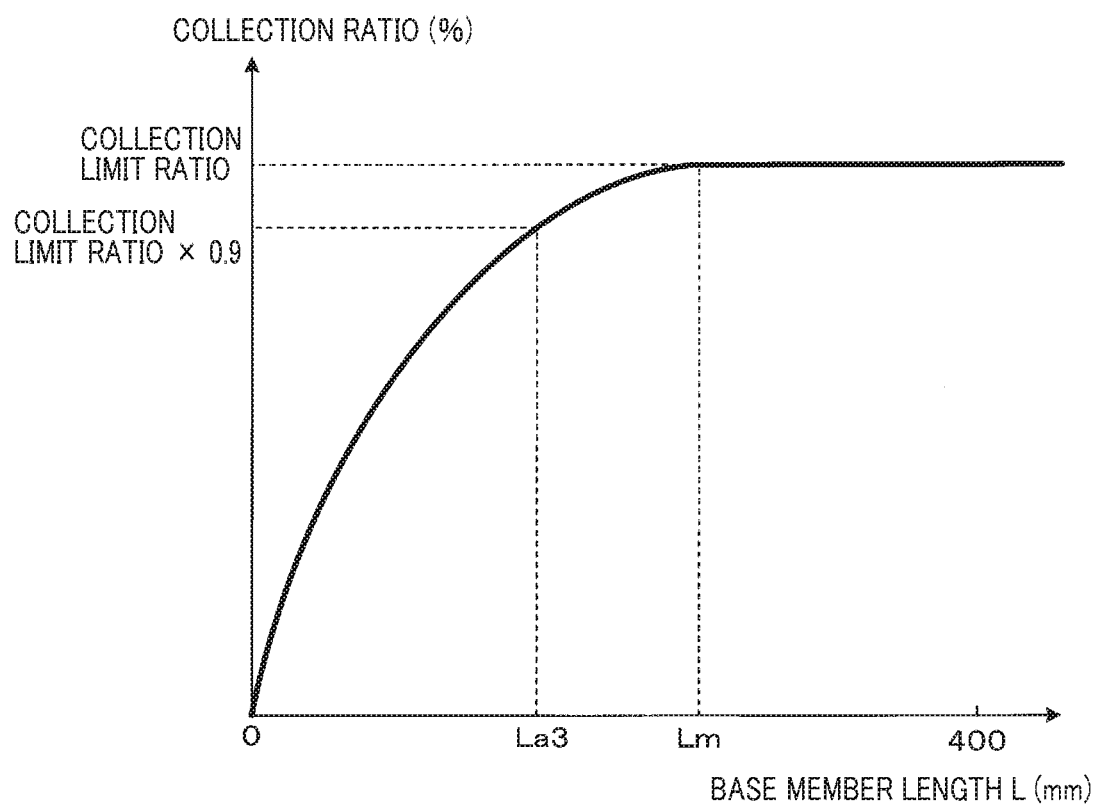
FIG. 7 is a graph showing a schematic relationship between the base member length, i.e. the total length of the exhaust gas filter and the collection ratio of the exhaust gas filter according to a third exemplary embodiment.

FIG. 7 is a view showing the schematic relationship between the base member length L and the collection ratio, which is similar to the relationship shown in FIG. 5 used in the explanation of the first exemplary embodiment. As shown in FIG. 7, the collection ratio is reduced according to shortening of the base member length L from the critical length Lm. When the base member length L becomes not more than the length which corresponds to the collection ratio of 90% of the collection limit ratio, the collection ratio due to the shortening if the base member length L is drastically reduced.

Accordingly, the third exemplary embodiment uses the third standard value L3 determined by the equation (3), which is the same as the minimum value (La3) of the base member length L when collection ratio becomes not less than 90%. That is, the base member length is determined as the minimum value La3 so that the collection ratio becomes 63% when the collection limit ratio is 70%.

Because the third exemplary embodiment provides the exhaust gas filter having the base member length L which is not less than the third standard value L3 and not more than the critical length Lm, it is possible for the exhaust gas filter 1 to have the high purification performance while reducing the pressure loss and the total size of the exhaust gas filter 1.

The use of the equation (3) affects the value of the collection limit ratio. In order to obtain the collection limit ratio, the third exemplary embodiment executed multiple regression analysis by using variables such as the flow passage cross sectional area ratio Rs, the thickness w of the cell walls 2, the permeability coefficient k, the cell density C, and the outer diameter $\phi$ of the exhaust gas filter 1.

The exhaust gas filter 1 according to the third exemplary embodiment has the first standard value L3 of 110 mm and the critical length Lm of 178 mm, as previously described, when the flow passage cross sectional area ratio Rs is 1.6, the thickness w of the cell walls 2 is 0.28 mm, the cell density C is 0.47 (cells/mm$^2$), the permeability coefficient k is 0.7 μm$^2$ and the outer diameter ϕ is 132.0 mm. The exhaust gas filter 1 according to the third exemplary embodiment has the base member length L which is not less than the third standard value L3 and not more than the critical length Lm.

The exhaust gas filter 1 according to the third exemplary embodiment has the structure, other than the above specific structure, which is the same as the structure of the exhaust gas filter 1 according to the first exemplary embodiment. The same components between the exhaust gas filter 1 according to the third exemplary embodiment and the exhaust gas filter 1 according to the first exemplary embodiment are designated by using the same reference characters and numbers.

The exhaust gas filter 1 according to the third exemplary embodiment has the high collection performance of collecting particulate matter contained in exhaust gas, and is capable of more improving the purification performance of the exhaust gas filter 1. Further, the exhaust gas filter 1 according to the third exemplary embodiment has the same action and effects of the exhaust gas filter 1 according to the first exemplary embodiment.

(Fourth Exemplary Embodiment)

The fourth exemplary embodiment provides the exhaust gas filter having the cells which are different in shape from the cells of the exhaust gas filter 1 according to the first exemplary embodiment.

The exhaust gas filter 1 according to the fourth exemplary embodiment has the cells 3 having the same shape. The cell 3 has a square shape. On a cross section of the exhaust gas filter 1, which is perpendicular to the axial direction of the exhaust gas filter 1, a vertical direction, which is in parallel to an one side of each cell having a square shape is aligned with a lateral direction which is perpendicular to the vertical direction. In the fourth exemplary embodiment, nine cells 3 are arranged in a lattice square shape so that three groups, each group having three cells, are arranged in the vertical direction and the lateral direction in parallel to each other. The nine cells 3 form a section. The sections, each of which having the three cells, are arranged in a specific arrangement. In each section, three cells, which are not arranged adjacently from each other, are the open cells 31, and the remaining cells in the section are the plugged cells 32. Accordingly, the exhaust gas filter 1 according to the fourth exemplary embodiment has the flow passage cross sectional area ratio Rs of 0.2 (Rs=0.2).

The other structure of the exhaust gas filter 1 according to the fourth exemplary embodiment is the same as the structure of the exhaust gas filter 1 according to the first exemplary embodiment previously described. The same components of the exhaust gas filter 1 according to the fourth exemplary embodiment and the first exemplary embodiment are referred with the same reference numbers and characters.

The exhaust gas filter 1 according to the fourth exemplary embodiment has a simple structure in which the cells 3 having the same shape when compared with the exhaust gas filter 1 according to the other exemplary embodiments previously described. This structure makes it possible to easily produce the exhaust gas filter 1. The exhaust gas filter 1 according to the fourth exemplary embodiment has the same action and effects of the exhaust gas filter 1 according to the first exemplary embodiment.

(First Recognition Test)

The first recognition test compared the flow passage cross sectional area ratio Rs, a permeate flow amount ratio and the collection ratio of test samples. This permeating amount ratio represents a ratio of an amount of exhaust gas to permeate and pass to the plugged cells 32 through the cell walls 2 to an amount of exhaust gas introduced into the open cells 32.

The first recognition test used exhaust gas filters 101 to 104 which had a different flow passage cross sectional area ratio Rs which is a ratio of S2 to S2. S1 indicates the flow passage cross sectional area of the open cells 31, and S2 indicates the flow passage cross sectional area of the plugged cells 32.

The exhaust gas filter 101 has a structure in which the flow passage cross sectional area ratio Rs of 0.5, and the open cells 31 and the plugged cells 32 are arranged in reverse arrangement when compared with the structure of the exhaust gas filter 1 according to the fourth exemplary embodiment.

As shown in FIG. 9, the exhaust gas filter 102 has a structure in which the flow passage cross sectional area ratio Rs of 1, and the open cells 31, and each of the plugged cells 32 has a square shape when viewed from the axial direction X.

The exhaust gas filter 103 has the flow passage cross sectional area ratio Rs of 2.1. The exhaust gas filter 104 has the flow passage cross sectional area ratio Rs of 4.

Each of the open cells 31 and the plugged cells 32 of the exhaust gas filter 103 and the exhaust gas filter 104 is similar in shape to each of the open cells 31 and the plugged cells 32 of the exhaust gas filter 1 according to the fourth exemplary embodiment. Each of the exhaust gas filters 101 to 104 has the base member length L, i.e. the total length L of 200 mm. Other components of the exhaust gas filters 101 to 104 are the same as those of the exhaust gas filter 1 according to the fourth exemplary embodiment, and will referred with the same reference characters and numbers, as shown in FIG. 9.

Figure 10A:
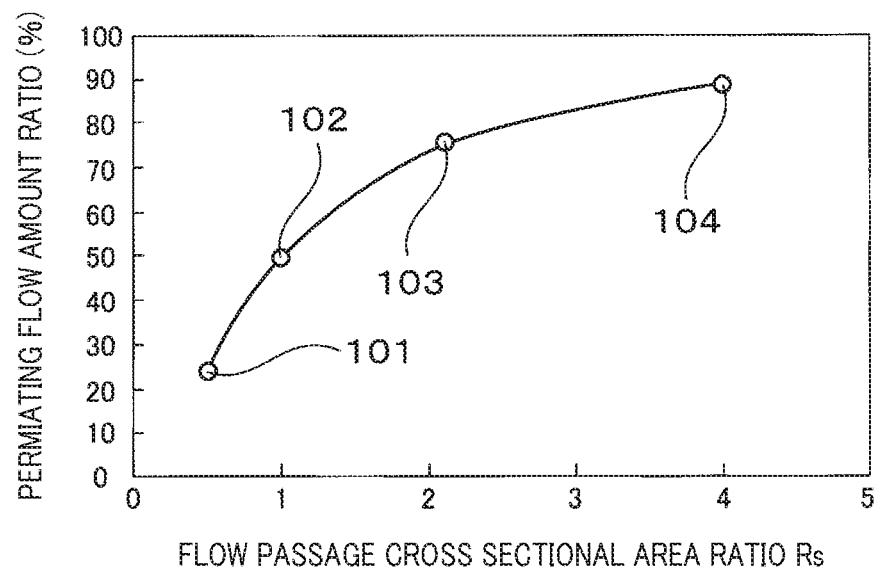
FIG. 10A is a graph showing a relationship between a permeate flow amount ratio and a flow passage cross sectional area ratio of the exhaust gas filter used by the first recognition test according to the present invention.

FIG. 10A is a view showing a relationship between the flow passage cross sectional area ratio Rs and the permeate flow amount ratio of the exhaust gas filters 101 to 104. In FIG. 10A, the vertical axis represents the permeate flow amount ratio (%), and the lateral axis represents the flow passage cross sectional area ratio Rs.

Figure 10B:
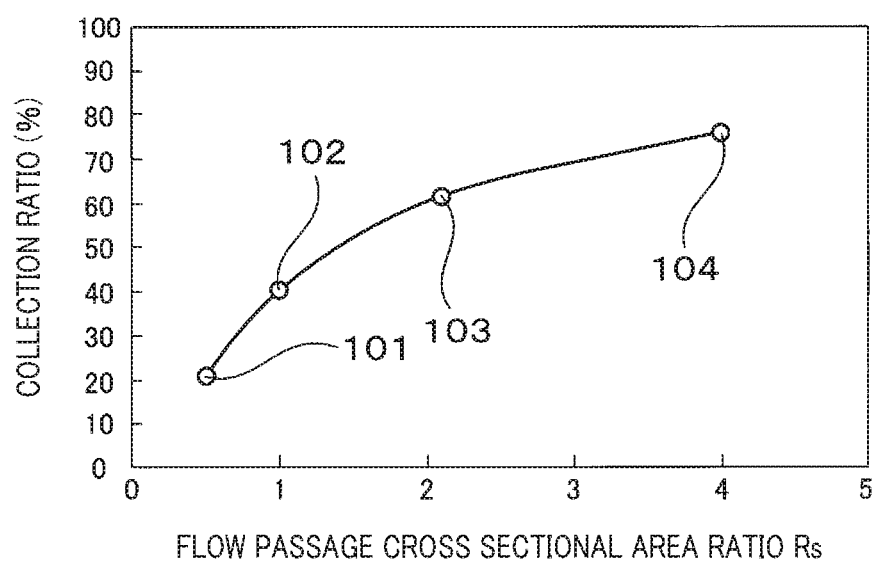
FIG. 10B is a graph showing a relationship between a collection ratio and the flow passage cross sectional area ratio of the exhaust gas filter used by the first recognition test according to the present invention.
Figure 11:
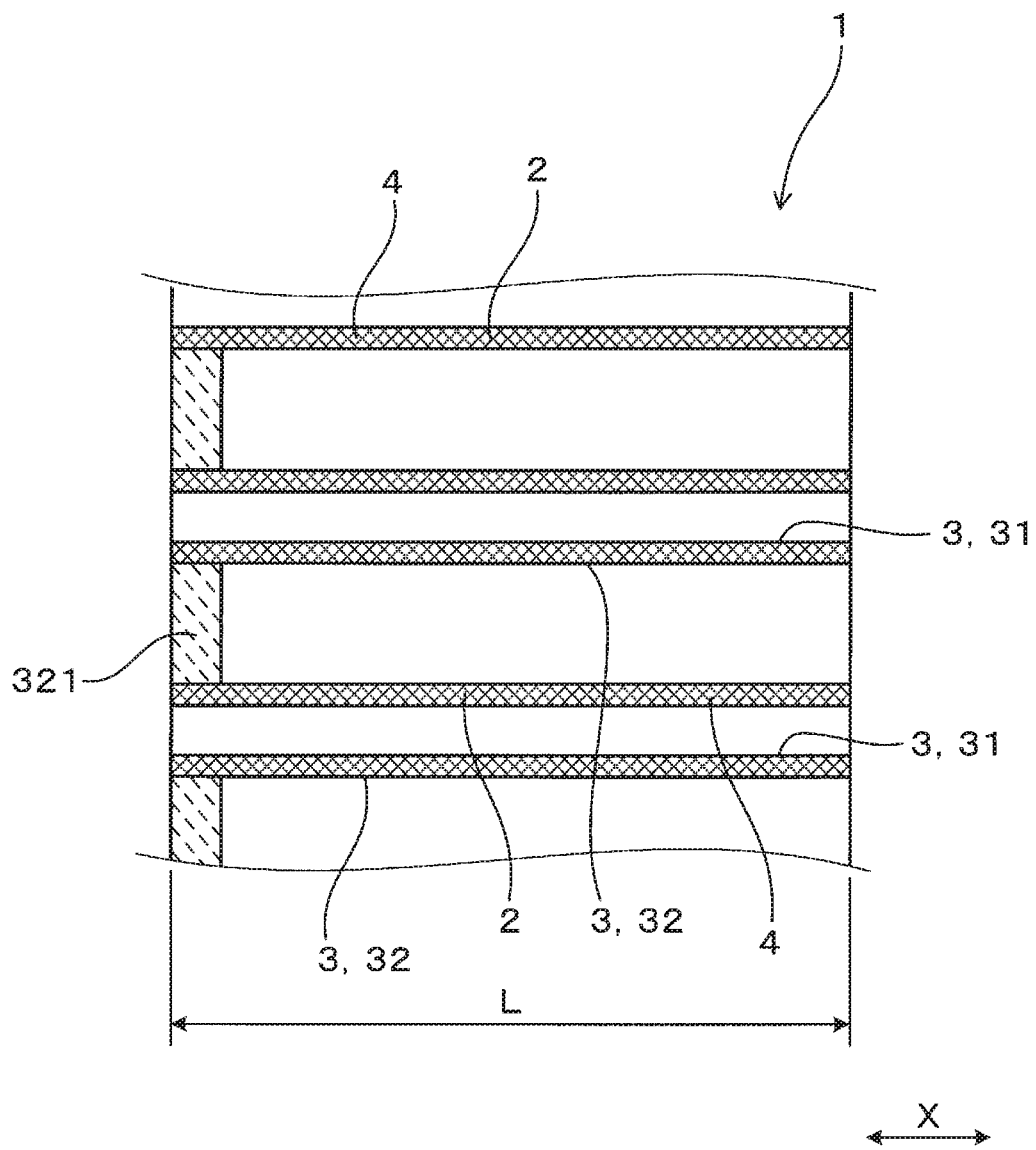
FIG. 11 is a view showing a cross section of an exhaust gas filter according to a fifth exemplary embodiment of the present invention.

FIG. 10B is a view showing a relationship between the flow passage cross sectional area ratio Rs and the collection ratio of the exhaust gas filters 101 to 104. In FIG. 10B, the vertical axis represents the collection ratio (%), and the lateral axis represents the flow passage cross sectional area ratio Rs.

As shown in FIG. 10A, the exhaust gas filter 101 has the permeate flow amount ratio of approximately 26%. The exhaust gas filter 102 has the permeate flow amount ratio of approximately 50%. The exhaust gas filter 103 has the permeate flow amount ratio of approximately 76%. The exhaust gas filter 101 has the permeate flow amount ratio of approximately 90%.

Further, as shown in FIG. 10B, the exhaust gas filter 101 has the collection ratio of approximately 21%. The exhaust gas filter 102 has the collection ratio of approximately 41%. The exhaust gas filter 103 has the collection ratio of approximately 62%. The exhaust gas filter 102 has the collection ratio of approximately 76%.

Accordingly, it is possible for exhaust of not less than 50% of exhaust gas introduced into the open cells 31 to permeate and pass to the cell walls 2 when the exhaust gas filter has the flow passage cross sectional area ratio Rs of more than 1.

Further, it is possible for exhaust of not less than 80% of exhaust gas introduced into the open cells 31 to permeate and pass to the cell walls 2 when the exhaust gas filter has the flow passage cross sectional area ratio Rs of not less than 2. These structures make it possible to increase the collection ratio of collecting particulate matter contained in exhaust gas.

The exhaust gas filter has the flow passage cross sectional area ratio Rs of approximately a constant value, and the collection ratio of approximately a constant value when the flow passage cross sectional area ratio Rs is within a range of exceeding 4.

(Second Recognition Test)

The second recognition test compared the collection ratio of collecting particulate matter contained in exhaust gas when changing the flow passage cross sectional area ratio Rs. Table 1 shows the results of the second recognition test.

The second recognition test used a test sample 1 having cells of the same shape. The second recognition test used test samples 2 to 4 having cells of a different hydraulic diameter.

The test sample 1 had the cells of a square shape in which the plugged cells and the open cells were alternately arranged. Accordingly, the test sample 1 has the flow passage cross sectional area ratio Rs of 1. The test sample 2 has the same structure of the exhaust gas filter 1 according to the first exemplary embodiment, excepting the base member length L, i.e. the total length L of the test sample 2 which is different from the base member length of the exhaust gas filter 1. Each of the test sample 3 and the test sample 4 has rectangular cells having a rectangular shape and octagonal cells having an octagonal shape, which are similar in shape to the two types of the cells of the exhaust gas filter 1 according to the first exemplary embodiment.

The test sample 3 has the flow passage cross sectional area ratio Rs of 4.0. The test sample 4 has the flow passage cross sectional area ratio Rs of 5.0. Each of the test samples 1 to 4 has the base member length L of 200 mm. Other components of each of the test samples 1 to 4 are the same as those of the exhaust gas filter 1 according to the first exemplary embodiment.

TABLE 1

| | FLOW PASSAGE CROSS SECTIONAL AREA RATIO Rs | COLLECTION RATIO (%) |
|---|---|---|
| TEST SAMPLE 1 | 1.0 | 42 |
| TEST SAMPLE 2 | 1.6 | 57 |
| TEST SAMPLE 3 | 4.0 | 76 |
| TEST SAMPLE 4 | 5.0 | 78 |

Table 1 shows the collection ratio of each of the test sample 1 to the test sample 4. As shown in Table 1, the test sample 1 has the collection ratio of 42%, the test sample 2 has the collection ratio of 57%, the test sample 3 has the collection ratio of 76% and the test sample 4 has the collection ratio of 78%. Accordingly, the results shown in Table 1 shows that the collection ratio of collecting particulate matter further improves according to increasing of the flow passage cross sectional area ratio Rs.

(Third Recognition Test)

The third recognition test detected the influence of the flow passage cross sectional area ratio Rs and the base member length, i.e. the total length on the collection ratio of the test samples, and the influence of the average pore diameter and the base member length on the collection ratio of the test samples.

The third recognition test used the test samples 2 to 26. The test samples 2 to 4 are the same test samples 2 to 4 used in the second recognition test.

As shown in Table 2, the test samples 5 to 8 have the flow passage cross sectional area ratio Rs of 1.6 because of having a different base member length (i.e. the total length L) when compared with the base member length of the test sample 2.

Further, as shown in Table 2, the test samples 9 to 12 have the flow passage cross sectional area ratio Rs of 4.0 because of having a different base member length when compared with the base member length of the test sample 3.

Further, as shown in Table 2, the test samples 13 to 16 have the flow passage cross sectional area ratio Rs of 5.0 because of having a different base member length (i.e. the total length L) when compared with the base member length of the test sample 4.

TABLE 2

| | FLOW PASSAGE CROSS SECTIONAL AREA RATIO Rs | BASE MEMBER LENGTH L (mm) | COLLECTION RATIO (%) |
|---|---|---|---|
| TEST SAMPLE 2 | 1.6 | 200 | 57 |
| TEST SAMPLE 5 | | 150 | 57 |
| TEST SAMPLE 6 | | 100 | 54 |
| TEST SAMPLE 7 | | 75 | 48 |
| TEST SAMPLE 8 | | 50 | 32 |
| TEST SAMPLE 3 | 4.0 | 200 | 76 |
| TEST SAMPLE 9 | | 150 | 70 |
| TEST SAMPLE 10 | | 100 | 54 |
| TEST SAMPLE 11 | | 75 | 42 |
| TEST SAMPLE 12 | | 50 | 29 |
| TEST SAMPLE 4 | 5.0 | 200 | 78 |
| TEST SAMPLE 13 | | 150 | 70 |
| TEST SAMPLE 14 | | 100 | 58 |
| TEST SAMPLE 15 | | 75 | 41 |
| TEST SAMPLE 16 | | 50 | 28 |

As shown in Table 3, the test sample 17 to the test sample 21 have the cell walls having an average pore size of 5 μm. The test sample 2, and the test sample 5 to the test sample 8 have the cell walls having an average pore size of 18 μm. Further, the test sample 22 to the test sample 26 have the cell walls having an average pore size of 30 μm. Other components of each of the test samples 2 to 26 are the same as those of the exhaust gas filter 1 according to the first exemplary embodiment.

TABLE 3

| | AVERAGE PORE SIZE (μm) | BASE MEMBER LENGTH L (mm) | COLLECTION RATIO (%) |
|---|---|---|---|
| TEST SAMPLE 17 | 5 | 200 | 67 |
| TEST SAMPLE 18 | | 150 | 67 |
| TEST SAMPLE 19 | | 100 | 41 |
| TEST SAMPLE 20 | | 75 | 27 |
| TEST SAMPLE 21 | | 50 | 17 |
| TEST SAMPLE 2 | 18 | 200 | 57 |
| TEST SAMPLE 5 | | 150 | 57 |
| TEST SAMPLE 6 | | 100 | 57 |
| TEST SAMPLE 7 | | 75 | 48 |
| TEST SAMPLE 8 | | 50 | 32 |
| TEST SAMPLE 22 | 30 | 200 | 46 |
| TEST SAMPLE 23 | | 150 | 46 |
| TEST SAMPLE 24 | | 100 | 43 |
| TEST SAMPLE 25 | | 75 | 39 |
| TEST SAMPLE 26 | | 50 | 22 |

As shown in Table 2, each of the test sample 2 and the test sample 5 to the test sample 8 has the structure in which the collection ratio increases according to increasing of the base member length L (i.e. the total length L), and the variation of the collection ratio becomes stable within a range of not less than 150 mm of the base member length L.

The collection ratio of each of the test sample 3, the test sample 4, and the test sample 9 to the test sample 16 is increased within the range of not more than 200 mm of the base member length L. It is accordingly recognized that the base member length L of the exhaust gas filter, required until the pressure loss of the open cells becomes equal to the pressure loss of the plugged cells, is increased due to the increasing of the flow passage cross sectional area ratio Rs. It is considered that this phenomenon is caused by increasing of the flow amount of exhaust gas introduced into the open cells in the exhaust gas filter.

Further, as shown in Table 3, each of the test sample 17 to the test sample 21 has the structure in which the collection ratio increases according to increasing of the base member length L (i.e. the total length L), and the variation of the collection ratio becomes stable within the range of not less than 150 mm of the base member length L.

Each of the test sample 2, the test sample 5 to the test sample 8, and the test samples 22 to 26 has a stable collection ratio when the base member length L is not less than 100 mm.

It is accordingly recognized that the base member length L of the exhaust gas filter, required until the pressure loss of the open cells becomes equal to the pressure loss of the plugged cells, is increased due to the increasing of the average pore size. It is considered that this phenomenon is caused by reduction of a permeate loss of exhaust gas in the cell walls of the exhaust gas filter.

(Fourth Recognition Test)

The fourth recognition test detected the accuracy of the equation (1) and the equation (M), and evaluated the pressure loss and the collection ratio of each of the test samples. The evaluation of the pressure loss and the collection ratio of each of the test samples will be described later.

The fourth recognition test recognized the accuracy of the equation (1) by comparing, with the first standard value L1 (as the calculated value) determined by using the equation (1), a measured value (as the first measured value) which is the minimum length (designated by the base member length La1 shown in FIG. 5 according to the first exemplary embodiment) in the base member length having the collection ratio obtained by subtracting a value of 10% from the collection limit ratio.

The fourth recognition test was recognized the accuracy of the equation (M) by comparing, with the critical length Lm (as a calculated value) determined by the equation (M), a measured value (hereinafter, referred with the critical length measured value) of the base member length (that is, the total length Lm shown in FIG. 5 according to the first exemplary embodiment) at which the collection ratio due to increasing of the base member length L stops increasing.

In order to obtain the first measured value and the stairwell critical length Lm (i.e. the critical length), the fourth recognition test used the test samples A1 to A78 having the basic structure which is the same as the basic structure of the exhaust gas filter 1 according to the first exemplary embodiment, but the test samples A1 to A78 had a different flow passage cross sectional area ratio Rs, a different thickness w of the cell walls, a different permeability coefficient k, a different cell density C, and a different outer diameter φ, respectively. In particular, the test samples A1 to A78 had the thickness w (mm) of the cell walls 2 was within a range of $0.13 \leq w \leq 0.47$, the permeability coefficient k ($\mu m^2$) within a range of $0.3 \leq k \leq 1.1$, the cell density C (cells/mm$^2$) within a range of $0.31 \leq C \leq 0.62$, and the outer diameter φ (mm) of the exhaust gas filter within a range of $80 \leq \varphi \leq 150$.

The fourth recognition test mounted each of the test samples on an exhaust gas pipe of a gasoline engine, and supplied exhaust gas of a flow amount of 4 m$^3$/min at a temperature of 700° C. to each of the test samples through the exhaust gas pipe.

The fourth recognition test measured the collection limit ratio (see FIG. 5) of the exhaust gas filter as each of the test samples having the base member length L, i.e. the total length (of 400 mm) which was an adequate length to obtain the collection limit ratio. Table 4 to Table 8 show the detection results as the collection limit ratios.

The fourth recognition test determined the collection ratio of each of the test samples by detecting the number of particulate matter contained in exhaust gas introduced into the inside of the exhaust gas filter as the test samples and the number of particulate matter contained in exhaust gas discharged from the exhaust gas filter. The fourth recognition test detected the collection ratio of the exhaust gas filter as each of the test samples which was different in base member length from each other by an increment of 5 mm.

The fourth recognition test used, as the first measured value, the minimum value in the base member length of not less than the collection ratio obtained by subtracting a value of 10% from the collection limit ratio.

Further, the fourth recognition test used, as the critical length measured value, the minimum value in the base member length when the collection ratio was higher than the collection ratio obtained by subtracting a value of 1% from the collection limit ratio.

Table 4 to Table 8 show the collection ratio of the exhaust gas filter as the test samples having the base member length L which is equal to the first measured value. Because of changing the base member length L of the test samples by an increment of 5 mm, Table 4 to Table 8 contain the test sample having the collection limit ratio which is slightly higher than the value obtained by subtracting a value of 10% from the collection limit ratio.

The fourth recognition test measured the pressure loss and the collection ratio of the exhaust gas filter as the test samples having the first measured value, and further measured the pressure loss and the collection ratio of the exhaust gas filter as the test samples having the critical length measured value. The fourth recognition test evaluated the pressure loss and the collection ratio of those test samples on the basis of the following judgment standard.

The fourth recognition test prepared an evaluation standard sample used for evaluating the pressure loss and the collection ratio of each of the test samples. The fourth recognition test used, as the evaluation standard sample, the test sample 1 (as the exhaust gas filter having the flow passage cross sectional area ratio Rs of 1.0) used in the second recognition test.

The fourth recognition test compared the each of the test samples in pressure loss and collection ratio with the evaluation standard sample so as to execute the evaluation of the pressure loss and the collection ratio of each of the test samples.

Specifically, the fourth recognition test executed the evaluation of the pressure loss and assigned an evaluation character "A" to the test sample having a pressure loss of less than 1.5 times of the pressure loss (=1.0) of the evaluation standard sample, and assigned an evaluation character "B" to the test sample having a pressure loss of not less than 1.5 times and less than 2.0 times of the pressure loss of the evaluation standard sample, and assigned an evaluation character "C" to the test sample having a pressure loss of not less than 2.0 times of the pressure loss of the evaluation standard sample.

Further, the fourth recognition test executed the evaluation of the collection ratio of each of the test samples, and assigned the evaluation character "A" to the test sample having a collection ratio which is not less than the collection ratio of the evaluation standard sample, and assigned the evaluation character "B" to the test sample having a collection ratio of less than the collection ratio of the evaluation standard sample.

Table 4 to Table 8 show a pressure loss evaluation 1 and a collection ratio evaluation 1 as the evaluation results of the pressure loss and the collection ratio of the exhaust gas filter having the first measured value as the base member length L. Tables 4 to 8 further show the pressure loss evaluation 2 and the collection ratio evaluation 2 as the evaluation results of the pressure loss and the collection ratio of the exhaust gas filter having the critical length measured value as the base member length L.

Table 4 to Table 8 show the evaluation results of the test samples in the fourth recognition test. In addition, Table 4 to Table 8 show an average pore size and a porosity of the cell walls of each of the test samples which are parameters which affect the permeability coefficient k of exhaust gas of the exhaust gas filter.

TABLE 4

| TEST SAMPLES | FLOW PASSAGE CROSS SECTIONAL AREA RATIO Rs [—] | THICKNESS OF CELL WALLS w [mm] | CELL DENSITY C [cells/mm$^2$] | PERMEABILITY COEFFICIENT OF EXHAUST GAS k [μm$^2$] | AVERAGE PORE SIZE [μm] | POROSITY [%] | OUTER DIAMETER φ [mm] | FIRST MEASURED VALUE [mm] | FIRST STANDARD VALUE (CALCULATED VALUE) L1 [mm] |
|---|---|---|---|---|---|---|---|---|---|
| A1 | 1.7 | 0.13 | 0.31 | 0.3 | 10 | 50 | 80 | 120 | 122 |
| A2 | 1.7 | 0.13 | 0.47 | 0.7 | 18 | 60 | 115 | 70 | 71 |
| A3 | 1.7 | 0.13 | 0.62 | 1.1 | 25 | 65 | 150 | 40 | 38 |
| A4 | 1.7 | 0.2 | 0.47 | 0.3 | 10 | 50 | 115 | 100 | 99 |
| A5 | 1.7 | 0.2 | 0.62 | 0.7 | 18 | 60 | 150 | 55 | 53 |
| A6 | 1.7 | 0.2 | 0.31 | 1.1 | 25 | 65 | 80 | 110 | 108 |
| A7 | 1.7 | 0.3 | 0.62 | 0.3 | 10 | 50 | 150 | 75 | 77 |
| A8 | 1.7 | 0.3 | 0.31 | 0.7 | 18 | 60 | 80 | 120 | 119 |
| A9 | 1.7 | 0.3 | 0.47 | 1.1 | 25 | 65 | 115 | 80 | 81 |
| A10 | 2.3 | 0.2 | 0.47 | 0.3 | 10 | 50 | 150 | 90 | 90 |
| A11 | 2.3 | 0.2 | 0.62 | 0.7 | 18 | 60 | 80 | 60 | 61 |
| A12 | 2.3 | 0.2 | 0.31 | 1.1 | 25 | 65 | 115 | 95 | 95 |
| A13 | 2.3 | 0.2 | 0.62 | 0.3 | 10 | 50 | 80 | 80 | 80 |
| A14 | 2.3 | 0.2 | 0.31 | 0.7 | 18 | 60 | 115 | 100 | 100 |
| A15 | 2.3 | 0.2 | 0.47 | 1.1 | 25 | 65 | 150 | 65 | 66 |
| A16 | 2.3 | 0.3 | 0.31 | 0.3 | 10 | 50 | 115 | 125 | 125 |
| A17 | 2.3 | 0.3 | 0.47 | 0.7 | 18 | 60 | 150 | 75 | 77 |
| A18 | 2.3 | 0.3 | 0.62 | 1.1 | 25 | 65 | 80 | 60 | 62 |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| A1 | 53% | A | A | 275 | 276 | 63% | C | A |
| A2 | 28% | A | B | 155 | 153 | 37% | A | B |
| A3 | 21% | A | B | 95 | 94 | 30% | A | B |
| A4 | 55% | A | A | 255 | 254 | 65% | B | A |
| A5 | 40% | A | B | 135 | 133 | 48% | A | A |
| A6 | 31% | A | B | 185 | 184 | 41% | A | B |
| A7 | 56% | A | A | 230 | 229 | 66% | B | A |
| A8 | 47% | A | A | 215 | 217 | 57% | A | A |
| A9 | 41% | A | B | 155 | 155 | 50% | A | A |
| A10 | 63% | B | A | 245 | 247 | 73% | B | A |
| A11 | 45% | A | A | 125 | 127 | 54% | A | A |
| A12 | 35% | A | B | 175 | 176 | 45% | A | A |
| A13 | 63% | B | A | 215 | 213 | 73% | B | A |
| A14 | 45% | A | A | 200 | 199 | 54% | A | A |
| A15 | 36% | A | B | 140 | 138 | 45% | A | A |
| A16 | 63% | B | A | 295 | 295 | 73% | C | A |
| A17 | 54% | A | A | 170 | 171 | 63% | A | A |
| A18 | 46% | A | A | 115 | 114 | 56% | A | A |

TABLE 5

| TEST SAMPLES | FLOW PASSAGE CROSS SECTIONAL AREA RATIO Rs [—] | THICKNESS OF CELL WALLS w [mm] | CELL DENSITY C [cells/mm²] | PERMEABILITY COEFFICIENT OF EXHAUST GAS k [µm²] | AVERAGE PORE SIZE [µm] | POROSITY [%] | OUTER DIAMETER φ [mm] | FIRST MEASURED VALUE [mm] | FIRST STANDARD VALUE (CALCULATED VALUE) L1 [mm] |
|---|---|---|---|---|---|---|---|---|---|
| A19 | 3 | 0.13 | 0.62 | 0.3 | 10 | 50 | 115 | 55 | 55 |
| A20 | 3 | 0.13 | 0.31 | 0.7 | 18 | 60 | 150 | 80 | 80 |
| A21 | 3 | 0.13 | 0.47 | 1.1 | 25 | 65 | 80 | 65 | 63 |
| A22 | 3 | 0.2 | 0.31 | 0.3 | 10 | 50 | 150 | 110 | 108 |
| A23 | 3 | 0.2 | 0.47 | 0.7 | 18 | 60 | 80 | 80 | 78 |
| A24 | 3 | 0.2 | 0.62 | 1.1 | 25 | 65 | 115 | 40 | 41 |
| A25 | 3 | 0.3 | 0.47 | 0.3 | 10 | 50 | 80 | 100 | 102 |
| A26 | 3 | 0.3 | 0.62 | 0.7 | 18 | 60 | 115 | 50 | 52 |
| A27 | 3 | 0.3 | 0.31 | 1.1 | 25 | 65 | 150 | 90 | 90 |
| A28 | 1.7 | 0.13 | 0.47 | 0.3 | 10 | 50 | 80 | 100 | 98 |
| A29 | 1.7 | 0.13 | 0.62 | 0.3 | 10 | 50 | 80 | 75 | 75 |
| A30 | 1.7 | 0.2 | 0.47 | 0.7 | 18 | 60 | 80 | 90 | 89 |
| A31 | 1.7 | 0.2 | 0.47 | 1.1 | 25 | 65 | 80 | 85 | 84 |
| A32 | 1.7 | 0.3 | 0.47 | 0.7 | 18 | 60 | 80 | 95 | 95 |
| A33 | 1.7 | 0.3 | 0.47 | 1.1 | 25 | 65 | 80 | 90 | 90 |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| A19 | 66% | B | A | 185 | 186 | 76% | B | A |
| A20 | 35% | A | B | 175 | 173 | 45% | A | A |
| A21 | 26% | A | B | 115 | 113 | 36% | A | B |
| A22 | 69% | B | A | 275 | 275 | 79% | C | A |
| A23 | 49% | A | A | 155 | 153 | 59% | A | A |
| A24 | 40% | A | B | 95 | 94 | 49% | A | A |
| A25 | 70% | B | A | 250 | 248 | 80% | B | A |
| A26 | 59% | A | A | 125 | 127 | 69% | A | A |
| A27 | 51% | A | A | 175 | 176 | 61% | A | A |
| A28 | 53% | A | A | 240 | 239 | 63% | A | A |
| A29 | 53% | A | A | 205 | 203 | 63% | A | A |
| A30 | 39% | A | B | 170 | 169 | 48% | A | A |
| A31 | 31% | A | B | 145 | 146 | 41% | A | B |
| A32 | 47% | A | A | 180 | 179 | 57% | A | A |
| A33 | 40% | A | B | 155 | 156 | 50% | A | A |

TABLE 6

| TEST SAMPLES | FLOW PASSAGE CROSS SECTIONAL AREA RATIO Rs [—] | THICKNESS OF CELL WALLS w [mm] | CELL DENSITY C [cells/mm²] | PERMEABILITY COEFFICIENT OF EXHAUST GAS k [µm²] | AVERAGE PORE SIZE [µm] | POROSITY [%] | OUTER DIAMETER φ [mm] | FIRST MEASURED VALUE [mm] | FIRST STANDARD VALUE (CALCULATED VALUE) L1 [mm] |
|---|---|---|---|---|---|---|---|---|---|
| A34 | 2.3 | 0.13 | 0.47 | 0.3 | 10 | 50 | 80 | 95 | 93 |
| A35 | 2.3 | 0.13 | 0.47 | 0.7 | 18 | 60 | 80 | 75 | 75 |
| A36 | 2.3 | 0.2 | 0.47 | 0.7 | 18 | 60 | 80 | 35 | 84 |
| A37 | 2.3 | 0.2 | 0.62 | 0.7 | 18 | 60 | 80 | 60 | 61 |
| A38 | 2.3 | 0.3 | 0.47 | 0.7 | 18 | 60 | 80 | 90 | 90 |
| A39 | 2.3 | 0.3 | 0.47 | 1.1 | 25 | 65 | 80 | 85 | 85 |
| A40 | 3 | 0.13 | 0.47 | 0.7 | 18 | 60 | 80 | 70 | 68 |
| A41 | 3 | 0.13 | 0.47 | 0.3 | 10 | 50 | 80 | 85 | 87 |
| A42 | 3 | 0.2 | 0.62 | 0.7 | 18 | 60 | 80 | 55 | 55 |
| A43 | 3 | 0.2 | 0.47 | 1.1 | 25 | 65 | 80 | 75 | 73 |
| A44 | 3 | 0.3 | 0.47 | 0.7 | 18 | 60 | 80 | 85 | 84 |
| A45 | 3 | 0.3 | 0.47 | 1.1 | 25 | 65 | 80 | 80 | 79 |

TABLE 6-continued

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| A34 | 60% | B | A | 230 | 232 | 70% | B | A |
| A35 | 32% | A | B | 145 | 146 | 41% | A | B |
| A36 | 44% | A | A | 160 | 162 | 54% | A | A |
| A37 | 45% | A | A | 125 | 127 | 54% | A | A |
| A38 | 54% | A | A | 170 | 172 | 63% | A | A |
| A39 | 47% | A | A | 150 | 149 | 56% | A | A |
| A40 | 36% | A | B | 135 | 137 | 45% | A | A |
| A41 | 67% | B | A | 220 | 222 | 76% | B | A |
| A42 | 49% | A | A | 120 | 118 | 59% | A | A |
| A43 | 40% | A | B | 130 | 130 | 49% | A | A |
| A44 | 60% | A | A | 165 | 163 | 69% | A | A |
| A45 | 52% | A | A | 140 | 140 | 61% | A | A |

TABLE 7

| TEST SAMPLES | FLOW PASSAGE CROSS SECTIONAL AREA RATIO $Rs$ [—] | THICKNESS OF CELL WALLS $w$ [mm] | CELL DENSITY $C$ [cells/mm$^2$] | PERMEABILITY COEFFICIENT OF EXHAUST GAS $k$ [µm$^2$] | AVERAGE PORE SIZE [µm] | POROSITY [%] | OUTER DIAMETER $\phi$ [mm] | FIRST MEASURED VALUE [mm] | FIRST STANDARD VALUE (CALCULATED VALUE) $L1$ [mm] |
|---|---|---|---|---|---|---|---|---|---|
| A46 | 1.7 | 0.13 | 0.31 | 0.7 | 18 | 60 | 115 | 95 | 95 |
| A47 | 1.7 | 0.2 | 0.31 | 0.7 | 18 | 60 | 115 | 105 | 105 |
| A48 | 1.7 | 0.3 | 0.31 | 1.1 | 25 | 65 | 115 | 105 | 106 |
| A49 | 2.3 | 0.13 | 0.31 | 0.7 | 18 | 60 | 115 | 90 | 90 |
| A50 | 2.3 | 0.2 | 0.31 | 0.7 | 18 | 60 | 150 | 95 | 96 |
| A51 | 2.3 | 0.3 | 0.31 | 1.1 | 25 | 65 | 115 | 100 | 101 |
| A52 | 3 | 0.13 | 0.31 | 0.7 | 18 | 60 | 115 | 85 | 84 |
| A53 | 3 | 0.2 | 0.31 | 0.7 | 18 | 60 | 150 | 90 | 89 |
| A54 | 3 | 0.3 | 0.31 | 1.1 | 25 | 65 | 115 | 95 | 95 |
| A55 | 3 | 0.13 | 0.47 | 0.3 | 10 | 50 | 150 | 75 | 74 |
| A56 | 3 | 0.13 | 0.47 | 0.3 | 10 | 50 | 115 | 80 | 78 |
| A57 | 3 | 0.2 | 0.62 | 1.1 | 25 | 65 | 150 | 35 | 37 |
| A58 | 3 | 0.2 | 0.62 | 0.7 | 18 | 60 | 115 | 45 | 46 |
| A59 | 3 | 0.3 | 0.62 | 1.1 | 25 | 65 | 150 | 45 | 43 |
| A60 | 3 | 0.3 | 0.47 | 0.7 | 18 | 60 | 115 | 75 | 75 |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| A46 | 27% | A | B | 190 | 190 | 37% | A | B |
| A47 | 39% | A | B | 206 | 206 | 48% | A | A |
| A48 | 41% | A | B | 195 | 193 | 50% | A | A |
| A49 | 31% | A | B | 185 | 183 | 41% | A | B |
| A50 | 44% | A | A | 200 | 199 | 54% | A | A |
| A51 | 47% | A | A | 185 | 186 | 56% | A | A |
| A52 | 36% | A | B | 175 | 174 | 45% | A | A |
| A53 | 50% | A | A | 190 | 190 | 59% | A | A |
| A54 | 51% | A | A | 175 | 177 | 61% | A | A |
| A55 | 66% | B | A | 220 | 221 | 76% | B | A |
| A56 | 66% | B | A | 220 | 222 | 76% | B | A |
| A57 | 40% | A | B | 95 | 93 | 49% | A | A |
| A58 | 50% | A | A | 115 | 117 | 59% | A | A |
| A59 | 52% | A | A | 105 | 103 | 61% | A | A |
| A60 | 60% | A | A | 160 | 162 | 69% | A | A |

TABLE 8

| TEST SAMPLES | FLOW PASSAGE CROSS SECTIONAL AREA RATIO Rs [—] | THICKNESS OF CELL WALLS w [mm] | CELL DENSITY C [cells/mm²] | PERMEABILITY COEFFICIENT OF EXHAUST GAS k [µm²] | AVERAGE PORE SIZE [µm] | POROSITY [%] | OUTER DIAMETER φ [mm] | FIRST MEASURED VALUE [mm] | FIRST STANDARD VALUE (CALCULATED VALUE) L1 [mm] |
|---|---|---|---|---|---|---|---|---|---|
| A61 | 1.1 | 0.2 | 0.31 | 0.3 | 10 | 50 | 80 | 135 | 136 |
| A62 | 1.1 | 0.31 | 0.47 | 0.3 | 10 | 50 | 115 | 110 | 109 |
| A63 | 1.1 | 0.47 | 0.62 | 0.3 | 10 | 50 | 150 | 85 | 86 |
| A64 | 1.1 | 0.47 | 0.31 | 0.7 | 18 | 60 | 80 | 130 | 128 |
| A65 | 1.1 | 0.31 | 0.47 | 0.3 | 10 | 50 | 150 | 105 | 105 |
| A66 | 1.1 | 0.31 | 0.62 | 0.3 | 10 | 50 | 80 | 95 | 95 |
| A67 | 1.1 | 0.31 | 0.31 | 0.7 | 18 | 60 | 115 | 115 | 115 |
| A68 | 1.1 | 0.47 | 0.31 | 0.3 | 10 | 50 | 115 | 140 | 138 |
| A69 | 1.1 | 0.47 | 0.62 | 1.1 | 25 | 65 | 80 | 75 | 75 |
| A70 | 5 | 0.2 | 0.31 | 0.3 | 10 | 50 | 80 | 100 | 99 |
| A71 | 5 | 0.31 | 0.47 | 0.3 | 10 | 50 | 115 | 70 | 72 |
| A72 | 5 | 0.47 | 0.62 | 0.3 | 10 | 50 | 150 | 50 | 49 |
| A73 | 5 | 0.47 | 0.31 | 0.7 | 18 | 60 | 80 | 90 | 91 |
| A74 | 5 | 0.31 | 0.47 | 0.3 | 10 | 50 | 150 | 70 | 68 |
| A75 | 5 | 0.31 | 0.62 | 0.3 | 10 | 50 | 80 | 60 | 58 |
| A76 | 5 | 0.31 | 0.31 | 0.7 | 18 | 60 | 115 | 75 | 78 |
| A77 | 5 | 0.47 | 0.31 | 0.3 | 10 | 50 | 115 | 100 | 100 |
| A78 | 5 | 0.47 | 0.62 | 1.1 | 25 | 65 | 80 | 40 | 38 |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| A61 | 40% | A | B | 300 | 298 | 50% | C | A |
| A62 | 43% | A | A | 270 | 271 | 53% | B | A |
| A63 | 43% | A | A | 240 | 242 | 53% | B | A |
| A64 | 36% | A | B | 230 | 230 | 46% | B | A |
| A65 | 43% | A | A | 270 | 270 | 53% | B | A |
| A66 | 43% | A | A | 235 | 236 | 53% | B | A |
| A67 | 29% | A | B | 225 | 223 | 39% | B | B |
| A68 | 43% | A | A | 315 | 315 | 53% | C | A |
| A69 | 30% | A | B | 135 | 134 | 40% | A | B |
| A70 | 74% | C | A | 245 | 243 | 84% | C | A |
| A71 | 77% | C | A | 215 | 216 | 87% | C | A |
| A72 | 78% | C | A | 185 | 187 | 88% | C | A |
| A73 | 66% | B | A | 175 | 175 | 76% | B | A |
| A74 | 77% | C | A | 215 | 215 | 87% | C | A |
| A75 | 77% | C | A | 180 | 181 | 87% | C | A |
| A76 | 55% | B | A | 170 | 168 | 65% | B | A |
| A77 | 78% | C | A | 260 | 260 | 88% | C | A |
| A78 | 57% | A | A | 80 | 79 | 67% | A | A |

It can be understood from Table 4 to Table 8 that the first standard value L1 obtained by the equation (1) is approximately equal to the first measured value measured by the fourth recognition test. According to the equation (1), it can be recognized for the equation (1) to calculate the minimum value of the base member length L with high accuracy when the collection ratio became not less than a value obtained by subtracting a value of 10% from the collection limit ratio while considering influence from the parameters of the exhaust gas filter 1.

It can be recognized from Table 4 to Table 8 that the stairwell critical length Lm (i.e. the critical length) calculated by the equation (M) was approximately equal to the critical length measured value obtained by the experimental test. According to the equation (M), it can be recognized for the equation (M) to calculate the minimum value of the base member length L with high accuracy when the collection ratio became not less than a value obtained by subtracting a value of 1% from the collection limit ratio while considering influence from the parameters of the exhaust gas filter 1.

Furthermore, as can be understood from Table 4 to Table 8, it can be recognized that there is the tendency in which the collection ratio is improved, i.e., becomes increased according to increasing of the base member length L, and the pressure loss is improved, i.e. reduced according to reducing of the base member length L. In other words, it can be understood that the longer the base member length L is, the more the pressure loss is reduced, and the shorter the base member length L is, the more the collection ratio is reduced. The base member length, i.e. the total length of the exhaust gas filter has an optimum length capable of improving both the pressure loss and the collection ratio simultaneously, not too long or not too short.

Because of having the base member length L which is not less than the first standard value L1 calculated by the equation (1) with high accuracy, it is possible for the exhaust gas filter 1 according to the first exemplary embodiment to have the high collection ratio. Furthermore, because of having the base member length L which is not more than the critical length Lm calculated by the equation (M) with high accuracy, it is possible for the exhaust gas filter 1 according to the first exemplary embodiment to have the reduced pressure loss. That is, because the exhaust gas filter has the base member length within the range of not less than the first standard value L1 and not more than the critical length Lm, it is possible for the exhaust gas filter to improve the pressure loss and the collection ratio simultaneously.

(Fifth Recognition Test)

The fifth recognition test detected the accuracy of the equation (2) by comparing, with the second standard value L2 calculated by using the equation (2), an actual measured value (i.e. the second measured value) of the minimum value (which corresponds to the base member length La2 shown in FIG. 6 according to the second exemplary embodiment) in the base member length having the collection ratio of not less than 50%.

The fifth recognition test used the test samples B1 to B50 having the basic structure which is the same as the basic structure of the exhaust gas filter 1 according to the first exemplary embodiment, but the test samples B1 to B50 had a different flow passage cross sectional area ratio Rs, a different thickness w of the cell walls, a different permeability coefficient k, a different cell density C, and a different outer diameter φ, respectively. The conditions of the fifth recognition test are the same as those of the fourth recognition test previously described.

The fifth recognition test measured the collection ratio of each of the test samples by varying the base member length L (i.e. the total length L) by an increment of 5 mm, and determined, as the second measured value, the minimum value of the base member length having not less than 50% of the collection ratio. Table 9 to Table 11 show the collection ratio of the exhaust gas filter as the test samples having the base member length of the second measured value. Because the base member length was varied by an increment of 5 mm, Table 9 to Table 15 contain the test sample having the collection ratio which is slightly higher than 50%.

Similar to the fourth recognition test, the fifth recognition test executed the evaluation of the pressure loss and the collection ratio of the exhaust gas filter as the test samples.

Similar to the fourth recognition test, the fifth recognition test compared the each of the test samples in pressure loss and collection ratio with the evaluation standard sample so as to execute the evaluation of the pressure loss and the collection ratio of each of the test samples. Table 9 to Table 11 show the results of the evaluation.

Table 9 to Table 11 show the average pore size and the porosity of the cell walls as the parameters affecting the permeability coefficient k of the exhaust gas filter.

In Table 9 to Table 11, the pressure loss evaluation 1 represents the result of the evaluation of the exhaust gas filter as the test sample having the base member length L of the second measured value. All of the test samples of the fifth recognition test had the collection ratio of not less than 50%, and as previously described, the evaluation standard sample of the second recognition test has the collection ratio of 42%. Accordingly, because the test samples of the fifth recognition test exceed the collection ratio of the evaluation standard sample, Table 9 to Table 11 omit the results of the evaluation of the collection ratio.

TABLE 9

| TEST SAMPLES | FLOW PASSAGE CROSS SECTIONAL AREA RATIO Rs [—] | THICK-NESS OF CELL WALLS w [mm] | CELL DENSITY C [cells/mm$^2$] | PERMEABILITY COEFFICIENT OF EXHAUST GAS k [μm$^2$] | AVERAGE PORE SIZE [μm] | POROS-ITY [%] | OUTER DIAMETER φ [mm] | SECOND MEASURED VALUE [mm] |
|---|---|---|---|---|---|---|---|---|
| B1 | 1.7 | 0.13 | 0.31 | 0.3 | 10 | 50 | 80 | 135 |
| B2 | 1.7 | 0.2 | 0.47 | 0.3 | 10 | 50 | 115 | 105 |
| B3 | 1.7 | 0.3 | 0.62 | 0.3 | 10 | 50 | 150 | 85 |
| B4 | 1.7 | 0.3 | 0.31 | 0.7 | 18 | 60 | 80 | 125 |
| B5 | 2.3 | 0.2 | 0.47 | 0.3 | 10 | 50 | 150 | 85 |
| B6 | 2.3 | 0.2 | 0.62 | 0.3 | 10 | 50 | 80 | 75 |
| B7 | 2.3 | 0.2 | 0.31 | 0.7 | 18 | 60 | 115 | 105 |
| B8 | 2.3 | 0.3 | 0.31 | 0.3 | 10 | 50 | 115 | 110 |
| B9 | 2.3 | 0.3 | 0.62 | 1.1 | 25 | 65 | 80 | 65 |
| B10 | 3 | 0.13 | 0.62 | 0.3 | 10 | 50 | 115 | 50 |
| B11 | 3 | 0.2 | 0.31 | 0.3 | 10 | 50 | 150 | 85 |
| B12 | 3 | 0.2 | 0.47 | 0.7 | 18 | 60 | 80 | 65 |
| B13 | 3 | 0.3 | 0.47 | 0.3 | 10 | 50 | 80 | 70 |
| B14 | 3 | 0.3 | 0.62 | 0.7 | 18 | 60 | 115 | 40 |
| B15 | 3 | 0.3 | 0.31 | 1.1 | 25 | 65 | 150 | 75 |
| B16 | 1.7 | 0.13 | 0.47 | 0.3 | 10 | 50 | 80 | 115 |
| B17 | 1.7 | 0.13 | 0.62 | 0.3 | 10 | 50 | 80 | 95 |
| B18 | 1.7 | 0.3 | 0.47 | 0.7 | 18 | 60 | 80 | 105 |

| TEST SAMPLES | SECOND STANDARD VALUE (CALCULATED VALUE) L2 [mm] | COLLEC-TION RATIO [%] | PRESSURE LOSS EVALU-ATION 1 | CRITERION LENGTH MEASURED VALUE [mm] | OPEN CRITICAL LENGTH (CALCULATED VALUE) Lm [mm] | COLLEC-TION LIMIT RATIO [%] | PRESSURE LOSS EVALU-ATION 2 |
|---|---|---|---|---|---|---|---|
| B1 | 134 | 50% | B | 275 | 276 | 63% | C |
| B2 | 107 | 50% | A | 255 | 254 | 65% | B |
| B3 | 83 | 50% | A | 230 | 229 | 66% | B |
| B4 | 125 | 50% | A | 215 | 217 | 57% | A |
| B5 | 87 | 51% | A | 245 | 247 | 73% | B |
| B6 | 74 | 50% | B | 215 | 213 | 73% | B |
| B7 | 105 | 50% | A | 200 | 199 | 54% | A |
| B8 | 110 | 50% | B | 295 | 295 | 73% | C |
| B9 | 65 | 50% | A | 115 | 114 | 56% | A |
| B10 | 49 | 50% | A | 185 | 186 | 76% | A |

TABLE 9-continued

| | | | | | | | |
|---|---|---|---|---|---|---|---|
| B11 | 86 | 50% | A | 275 | 275 | 79% | C |
| B12 | 65 | 50% | A | 155 | 153 | 59% | A |
| B13 | 70 | 50% | B | 250 | 248 | 80% | B |
| B14 | 40 | 52% | A | 125 | 127 | 69% | A |
| B15 | 77 | 50% | A | 175 | 176 | 61% | A |
| B16 | 113 | 50% | A | 240 | 239 | 63% | B |
| B17 | 93 | 50% | A | 205 | 203 | 63% | A |
| B18 | 104 | 51% | A | 180 | 179 | 57% | A |

TABLE 10

| TEST SAMPLES | FLOW PASSAGE CROSS SECTIONAL AREA RATIO Rs [—] | THICKNESS OF CELL WALLS w [mm] | CELL DENSITY C [cells/mm$^2$] | PERMEABILITY COEFFICIENT OF EXHAUST GAS k [μm$^2$] | AVERAGE PORE SIZE [μm] | POROSITY [%] | OUTER DIAMETER φ [mm] | SECOND MEASURED VALUE [mm] |
|---|---|---|---|---|---|---|---|---|
| B19 | 2.3 | 0.13 | 0.47 | 0.3 | 10 | 50 | 80 | 95 |
| B20 | 2.3 | 0.2 | 0.47 | 0.7 | 18 | 60 | 80 | 90 |
| B21 | 2.3 | 0.2 | 0.62 | 0.7 | 18 | 60 | 80 | 70 |
| B22 | 2.3 | 0.3 | 0.47 | 1.1 | 25 | 65 | 80 | 85 |
| B23 | 3 | 0.13 | 0.47 | 0.3 | 10 | 50 | 80 | 75 |
| B24 | 3 | 0.2 | 0.62 | 0.7 | 18 | 60 | 80 | 45 |
| B25 | 3 | 0.3 | 0.47 | 0.7 | 18 | 60 | 80 | 65 |
| B26 | 3 | 0.3 | 0.47 | 1.1 | 25 | 65 | 80 | 60 |
| B27 | 2.3 | 0.2 | 0.31 | 0.7 | 18 | 60 | 150 | 105 |
| B28 | 2.3 | 0.3 | 0.31 | 1.1 | 25 | 65 | 115 | 100 |
| B29 | 3 | 0.2 | 0.31 | 0.7 | 18 | 60 | 150 | 80 |
| B30 | 3 | 0.3 | 0.31 | 1.1 | 25 | 65 | 115 | 80 |
| B31 | 3 | 0.13 | 0.47 | 0.3 | 10 | 50 | 150 | 65 |
| B32 | 3 | 0.13 | 0.47 | 0.3 | 10 | 50 | 115 | 70 |
| B33 | 3 | 0.2 | 0.62 | 0.7 | 18 | 60 | 115 | 40 |
| B34 | 3 | 0.3 | 0.62 | 1.1 | 25 | 65 | 150 | 35 |
| B35 | 3 | 0.3 | 0.47 | 0.7 | 18 | 60 | 115 | 60 |

| TEST SAMPLES | SECOND STANDARD VALUE (CALCULATED VALUE) L2 [mm] | COLLECTION RATIO [%] | PRESSURE LOSS EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 |
|---|---|---|---|---|---|---|---|
| B19 | 96 | 51% | A | 230 | 232 | 70% | B |
| B20 | 88 | 50% | A | 160 | 162 | 54% | A |
| B21 | 68 | 50% | A | 125 | 127 | 54% | A |
| B22 | 85 | 50% | A | 150 | 149 | 56% | A |
| B23 | 73 | 51% | A | 220 | 222 | 76% | A |
| B24 | 45 | 52% | A | 120 | 118 | 59% | A |
| B25 | 64 | 52% | A | 165 | 163 | 69% | A |
| B26 | 62 | 52% | A | 140 | 140 | 61% | A |
| B27 | 103 | 50% | A | 200 | 199 | 54% | A |
| B28 | 102 | 50% | A | 185 | 186 | 56% | A |
| B29 | 80 | 50% | A | 190 | 190 | 59% | A |
| B30 | 79 | 51% | A | 175 | 177 | 61% | A |
| B31 | 67 | 50% | A | 220 | 221 | 76% | A |
| B32 | 69 | 52% | A | 220 | 222 | 76% | B |
| B33 | 41 | 51% | A | 115 | 117 | 59% | A |
| B34 | 36 | 52% | A | 105 | 103 | 61% | A |
| B35 | 60 | 51% | A | 160 | 162 | 69% | A |

TABLE 11

| TEST SAMPLES | FLOW PASSAGE CROSS SECTIONAL AREA RATIO Rs [—] | THICKNESS OF CELL WALLS w [mm] | CELL DENSITY C [cells/mm$^2$] | PERMEABILITY COEFFICIENT OF EXHAUST GAS k [μm$^2$] | AVERAGE PORE SIZE [μm] | POROSITY [%] | OUTER DIAMETER φ [mm] | SECOND MEASURED VALUE [mm] |
|---|---|---|---|---|---|---|---|---|
| B36 | 1.1 | 0.2 | 0.31 | 0.3 | 10 | 50 | 80 | 145 |
| B37 | 1.1 | 0.31 | 0.47 | 0.3 | 10 | 50 | 115 | 120 |
| B38 | 1.1 | 0.47 | 0.62 | 0.3 | 10 | 50 | 150 | 95 |
| B39 | 1.1 | 0.31 | 0.47 | 0.3 | 10 | 50 | 150 | 115 |
| B40 | 1.1 | 0.31 | 0.62 | 0.3 | 10 | 50 | 80 | 105 |
| B41 | 1.1 | 0.47 | 0.31 | 0.3 | 10 | 50 | 115 | 140 |

| TEST SAMPLES | SECOND STANDARD VALUE (CALCULATED VALUE) L2 [mm] | COLLECTION RATIO [%] | PRESSURE LOSS EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 |
|---|---|---|---|---|---|---|---|
| B36 | 146 | 50% | A | 300 | 298 | 50% | C |
| B37 | 120 | 50% | B | 270 | 271 | 53% | B |
| B38 | 97 | 50% | A | 240 | 242 | 53% | B |
| B39 | 117 | 50% | A | 270 | 270 | 53% | B |
| B40 | 104 | 50% | B | 235 | 236 | 53% | B |
| B41 | 140 | 50% | B | 315 | 315 | 53% | C |

As can be understood from Table 9 to Table 11, the second standard value L2 calculated by the equation (2) is approximately equal to the second measured value obtained by the experiment. According to the equation (2), it can be recognized for the equation (2) to calculate the minimum value of the base member length L with high accuracy when the collection ratio became not less than 50% while considering influence from the parameters of the exhaust gas filter 1. In addition, it can be recognized that a single exhaust gas filter will have a collection performance of not less than 50%, without using plural exhaust gas filter arranged in series, when the flow passage cross sectional area ratio Rs is more than 1, and the base member length is not less than the second standard value and not more than the stairwell critical length Lm (i.e. the critical length Lm).

(Sixth Recognition Test)

The sixth recognition test detected the accuracy of the equation (3) by comparing, with the second standard value L3 calculated by using the equation (3), an actual measured value (i.e. the third measured value) of the minimum value (which corresponds to the base member length La3 shown in FIG. 7 according to the third exemplary embodiment) in the base member length (i.e. the total length L) having the collection ratio of not less than 90%.

In order to obtain the second measured value, the sixth recognition test used the test samples C1 to C78 having the basic structure which is the same as the basic structure of the exhaust gas filter 1 according to the first exemplary embodiment, but the test samples C1 to C78 had a different flow passage cross sectional area ratio Rs, a different thickness w of the cell walls, a different permeability coefficient k, a different cell density C, and a different outer diameter φ, respectively, as shown in Table 12 to Table 15. The sixth recognition test had the same test conditions of the fourth recognition test.

Similar to the fourth recognition test, the sixth recognition test measured the collection ratio of the exhaust gas filter as each of the test samples having the base member length L (of 400 mm) which was an adequate length to obtain the collection limit ratio, and measured the collection ratio of the exhaust gas filter as the test samples, the base member length of which were varied by an increment of 5 mm.

The sixth recognition test determines, as the third measured value, the minimum base member length having the collection ratio of not less than 90% of the collection limit ratio.

As shown in Table 12 to Table 15, the sixth recognition test determined the collection ratio of the exhaust gas filter having the third measured value as the base member length L in each of the test samples.

Because of changing the base member length L of the test samples by an increment of 5 mm, Table 12 to Table 15 contain the test ample having the collection limit ratio which is slightly higher than the value of 90% of the collection limit ratio.

Similar to the fourth recognition test, the sixth recognition test executed the evaluation of the pressure loss and the collection ratio of the exhaust gas filter as the test samples.

Similar to the fourth recognition test, the sixth recognition test compared each of the test samples in pressure loss and collection ratio with the evaluation standard sample under the judgment standard so as to execute the evaluation of the pressure loss and the collection ratio of each of the test samples. Table 12 to Table 15 show the results of the evaluation. Table 12 to Table 15 show the average pore size and the porosity of the cell walls as the parameters affecting the permeability coefficient k of the exhaust gas filter.

Table 12 to Table 15 show the average pore size and the porosity of the cell walls in each of the test samples as the parameters affecting the permeability coefficient k to exhaust gas.

Tables 12 to 15 further show the pressure loss evaluation 1 and the collection ratio evaluation 1 as the evaluation results of the pressure loss and the collection ratio of the exhaust gas filter having the third measured value as the base member length L.

TABLE 12

| TEST SAMPLES | FLOW PASSAGE CROSS SECTIONAL AREA RATIO Rs [—] | THICKNESS OF CELL WALLS w [mm] | CELL DENSITY C [cells/mm²] | PERMEABILITY COEFFICIENT OF EXHAUST GAS k [μm²] | AVERAGE PORE SIZE [μm] | POROSITY [%] | OUTER DIAMETER φ [mm] | THIRD MEASURED VALUE [mm] | THIRD STANDARD VALUE (CALCULATED VALUE) L3 [mm] |
|---|---|---|---|---|---|---|---|---|---|
| C1  | 1.7 | 0.13 | 0.31 | 0.3 | 10 | 50 | 80  | 155 | 156 |
| C2  | 1.7 | 0.13 | 0.47 | 0.7 | 18 | 60 | 115 | 95  | 93  |
| C3  | 1.7 | 0.13 | 0.62 | 1.1 | 25 | 65 | 150 | 55  | 53  |
| C4  | 1.7 | 0.2  | 0.47 | 0.3 | 10 | 50 | 115 | 130 | 128 |
| C5  | 1.7 | 0.2  | 0.62 | 0.7 | 18 | 60 | 150 | 70  | 71  |
| C6  | 1.7 | 0.2  | 0.31 | 1.1 | 25 | 65 | 80  | 140 | 139 |
| C7  | 1.7 | 0.3  | 0.62 | 0.3 | 10 | 50 | 150 | 100 | 101 |
| C8  | 1.7 | 0.3  | 0.31 | 0.7 | 18 | 60 | 80  | 155 | 153 |
| C9  | 1.7 | 0.3  | 0.47 | 1.1 | 25 | 65 | 115 | 105 | 106 |
| C10 | 2.3 | 0.2  | 0.47 | 0.3 | 10 | 50 | 150 | 115 | 114 |
| C11 | 2.3 | 0.2  | 0.62 | 0.7 | 18 | 60 | 80  | 80  | 78  |
| C12 | 2.3 | 0.2  | 0.31 | 1.1 | 25 | 65 | 115 | 120 | 120 |
| C13 | 2.3 | 0.2  | 0.62 | 0.3 | 10 | 50 | 80  | 100 | 101 |
| C14 | 2.3 | 0.2  | 0.31 | 0.7 | 18 | 60 | 115 | 125 | 127 |
| C15 | 2.3 | 0.2  | 0.47 | 1.1 | 25 | 65 | 150 | 85  | 85  |
| C16 | 2.3 | 0.3  | 0.31 | 0.3 | 10 | 50 | 115 | 155 | 157 |
| C17 | 2.3 | 0.3  | 0.47 | 0.7 | 18 | 60 | 150 | 100 | 98  |
| C18 | 2.3 | 0.3  | 0.62 | 1.1 | 25 | 65 | 80  | 80  | 79  |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| C1  | 58% | B | A | 275 | 276 | 63% | C | A |
| C2  | 35% | A | B | 155 | 153 | 37% | A | B |
| C3  | 28% | A | B | 95  | 94  | 30% | A | B |
| C4  | 60% | B | A | 255 | 254 | 65% | B | A |
| C5  | 43% | A | A | 135 | 133 | 48% | A | A |
| C6  | 38% | A | B | 185 | 184 | 41% | A | B |
| C7  | 60% | B | A | 230 | 229 | 66% | B | A |
| C8  | 52% | A | A | 215 | 217 | 57% | A | A |
| C9  | 47% | A | A | 155 | 155 | 50% | A | A |
| C10 | 67% | B | A | 245 | 247 | 73% | B | A |
| C11 | 51% | A | A | 125 | 127 | 54% | A | A |
| C12 | 42% | A | A | 175 | 176 | 45% | A | A |
| C13 | 67% | B | A | 215 | 213 | 73% | B | A |
| C14 | 51% | A | A | 200 | 199 | 54% | A | A |
| C15 | 42% | A | A | 140 | 138 | 45% | A | A |
| C16 | 67% | B | A | 295 | 295 | 73% | C | A |
| C17 | 58% | A | A | 170 | 171 | 63% | A | A |
| C18 | 51% | A | A | 115 | 114 | 56% | A | A |

TABLE 13

| TEST SAMPLES | FLOW PASSAGE CROSS SECTIONAL AREA RATIO Rs [—] | THICKNESS OF CELL WALLS w [mm] | CELL DENSITY C [cells/mm²] | PERMEABILITY COEFFICIENT OF EXHAUST GAS k [μm²] | AVERAGE PORE SIZE [μm] | POROSITY [%] | OUTER DIAMETER φ [mm] | THIRD MEASURED VALUE [mm] | THIRD STANDARD VALUE (CALCULATED VALUE) L3 [mm] |
|---|---|---|---|---|---|---|---|---|---|
| C19 | 3   | 0.13 | 0.62 | 0.3 | 10 | 50 | 115 | 65  | 67  |
| C20 | 3   | 0.13 | 0.31 | 0.7 | 18 | 60 | 150 | 100 | 98  |
| C21 | 3   | 0.13 | 0.47 | 1.1 | 25 | 65 | 80  | 75  | 76  |
| C22 | 3   | 0.2  | 0.31 | 0.3 | 10 | 50 | 150 | 135 | 133 |
| C23 | 3   | 0.2  | 0.47 | 0.7 | 18 | 60 | 80  | 95  | 95  |
| C24 | 3   | 0.2  | 0.62 | 1.1 | 25 | 65 | 115 | 50  | 50  |
| C25 | 3   | 0.3  | 0.47 | 0.3 | 10 | 50 | 80  | 125 | 125 |
| C26 | 3   | 0.3  | 0.62 | 0.7 | 18 | 60 | 115 | 65  | 64  |
| C27 | 3   | 0.3  | 0.31 | 1.1 | 25 | 65 | 150 | 110 | 111 |
| C28 | 1.7 | 0.13 | 0.47 | 0.3 | 10 | 50 | 80  | 125 | 126 |
| C29 | 1.7 | 0.13 | 0.62 | 0.3 | 10 | 50 | 80  | 95  | 97  |
| C30 | 1.7 | 0.2  | 0.47 | 0.7 | 18 | 60 | 80  | 115 | 115 |
| C31 | 1.7 | 0.2  | 0.47 | 1.1 | 25 | 65 | 80  | 110 | 109 |
| C32 | 1.7 | 0.3  | 0.47 | 0.7 | 18 | 60 | 80  | 120 | 122 |
| C33 | 1.7 | 0.3  | 0.47 | 1.1 | 25 | 65 | 80  | 115 | 116 |
| C34 | 2.3 | 0.13 | 0.47 | 0.3 | 10 | 50 | 80  | 115 | 117 |

TABLE 13-continued

| | | | | | | | | | |
|---|---|---|---|---|---|---|---|---|---|
| C35 | 2.3 | 0.13 | 0.47 | 0.7 | 18 | 60 | 80 | 95 | 94 |
| C36 | 2.3 | 0.2 | 0.47 | 0.7 | 18 | 60 | 80 | 105 | 106 |
| C37 | 2.3 | 0.2 | 0.62 | 0.7 | 18 | 60 | 80 | 80 | 78 |
| C38 | 2.3 | 0.3 | 0.47 | 0.7 | 18 | 60 | 80 | 115 | 114 |
| C39 | 2.3 | 0.3 | 0.47 | 1.1 | 25 | 65 | 80 | 110 | 108 |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| C19 | 69% | B | A | 185 | 186 | 76% | B | A |
| C20 | 42% | A | A | 175 | 173 | 45% | A | A |
| C21 | 34% | A | B | 115 | 113 | 36% | A | B |
| C22 | 72% | B | A | 275 | 275 | 79% | C | A |
| C23 | 54% | A | A | 155 | 153 | 59% | A | A |
| C24 | 45% | A | A | 95 | 94 | 49% | A | A |
| C25 | 73% | B | A | 250 | 248 | 80% | B | A |
| C26 | 63% | A | A | 125 | 127 | 69% | A | A |
| C27 | 55% | A | A | 175 | 176 | 61% | A | A |
| C28 | 57% | A | A | 240 | 239 | 63% | A | A |
| C29 | 59% | A | A | 205 | 203 | 63% | A | A |
| C30 | 44% | A | A | 170 | 169 | 48% | A | A |
| C31 | 38% | A | B | 145 | 146 | 41% | A | B |
| C32 | 52% | A | A | 180 | 179 | 57% | A | A |
| C33 | 44% | A | A | 155 | 156 | 50% | A | A |
| C34 | 63% | B | A | 230 | 232 | 70% | B | A |
| C35 | 38% | A | B | 145 | 146 | 41% | A | B |
| C36 | 51% | A | A | 160 | 162 | 54% | A | A |
| C37 | 51% | A | A | 125 | 127 | 54% | A | A |
| C38 | 58% | A | A | 170 | 172 | 63% | A | A |
| C39 | 52% | A | A | 150 | 149 | 56% | A | A |

TABLE 14

| TEST SAMPLES | FLOW PASSAGE CROSS SECTIONAL AREA RATIO Rs [—] | THICKNESS OF CELL WALLS w [mm] | CELL DENSITY C [cells/mm²] | PERMEABILITY COEFFICIENT OF EXHAUST GAS k [μm²] | AVERAGE PORE SIZE [μm] | POROSITY [%] | OUTER DIAMETER φ [mm] | THIRD MEASURED VALUE [mm] | THIRD STANDARD VALUE (CALCULATED VALUE) L3 [mm] |
|---|---|---|---|---|---|---|---|---|---|
| C40 | 3 | 0.13 | 0.47 | 0.7 | 18 | 60 | 80 | 85 | 83 |
| C41 | 3 | 0.13 | 0.47 | 0.3 | 10 | 50 | 80 | 105 | 105 |
| C42 | 3 | 0.2 | 0.62 | 0.7 | 18 | 60 | 80 | 65 | 66 |
| C43 | 3 | 0.2 | 0.47 | 1.1 | 25 | 65 | 80 | 90 | 88 |
| C44 | 3 | 0.3 | 0.47 | 0.7 | 18 | 60 | 80 | 100 | 102 |
| C45 | 3 | 0.3 | 0.47 | 1.1 | 25 | 65 | 80 | 95 | 96 |
| C46 | 1.7 | 0.13 | 0.31 | 0.7 | 18 | 60 | 115 | 125 | 123 |
| C47 | 1.7 | 0.2 | 0.31 | 0.7 | 18 | 60 | 115 | 135 | 135 |
| C48 | 1.7 | 0.3 | 0.31 | 1.1 | 25 | 65 | 115 | 135 | 137 |
| C49 | 2.3 | 0.13 | 0.31 | 0.7 | 18 | 60 | 115 | 115 | 115 |
| C50 | 2.3 | 0.2 | 0.31 | 0.7 | 18 | 60 | 150 | 120 | 121 |
| C51 | 2.3 | 0.3 | 0.31 | 1.1 | 25 | 65 | 115 | 130 | 128 |
| C52 | 3 | 0.13 | 0.31 | 0.7 | 18 | 60 | 115 | 105 | 103 |
| C53 | 3 | 0.2 | 0.31 | 0.7 | 18 | 60 | 150 | 110 | 110 |
| C54 | 3 | 0.3 | 0.31 | 1.1 | 25 | 65 | 115 | 115 | 116 |
| C55 | 3 | 0.13 | 0.47 | 0.3 | 10 | 50 | 150 | 90 | 90 |
| C56 | 3 | 0.13 | 0.47 | 0.3 | 10 | 50 | 115 | 95 | 95 |
| C57 | 3 | 0.2 | 0.62 | 1.1 | 25 | 65 | 150 | 45 | 45 |
| C58 | 3 | 0.2 | 0.62 | 0.7 | 18 | 60 | 115 | 55 | 56 |
| C59 | 3 | 0.3 | 0.62 | 1.1 | 25 | 65 | 150 | 50 | 52 |
| C60 | 3 | 0.3 | 0.47 | 0.7 | 18 | 60 | 115 | 90 | 92 |

| TEST SAMPLES | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|
| C40 | 41% | A | B | 135 | 137 | 45% | A | A |
| C41 | 69% | B | A | 220 | 222 | 76% | B | A |
| C42 | 54% | A | A | 120 | 118 | 59% | A | A |
| C43 | 44% | A | A | 130 | 130 | 49% | A | A |

TABLE 14-continued

| | | | | | | | | |
|---|---|---|---|---|---|---|---|---|
| C44 | 63% | A | A | 165 | 163 | 69% | A | A |
| C45 | 56% | A | A | 140 | 140 | 61% | A | A |
| C46 | 35% | A | B | 190 | 190 | 37% | A | B |
| C47 | 44% | A | A | 205 | 206 | 48% | A | A |
| C48 | 45% | A | A | 195 | 193 | 50% | A | A |
| C49 | 38% | A | B | 185 | 183 | 41% | A | B |
| C50 | 51% | A | A | 200 | 199 | 54% | A | A |
| C51 | 51% | A | A | 185 | 186 | 56% | A | A |
| C52 | 42% | A | A | 175 | 174 | 45% | A | A |
| C53 | 54% | A | A | 190 | 190 | 59% | A | A |
| C54 | 57% | A | A | 175 | 177 | 61% | A | A |
| C55 | 69% | B | A | 220 | 221 | 76% | B | A |
| C56 | 69% | B | A | 220 | 222 | 76% | B | A |
| C57 | 45% | A | A | 95 | 93 | 49% | A | A |
| C58 | 54% | A | A | 115 | 117 | 59% | A | A |
| C59 | 56% | A | A | 105 | 103 | 61% | A | A |
| C60 | 63% | A | A | 160 | 162 | 69% | A | A |

TABLE 15

| TEST SAMPLES | FLOW PASSAGE CROSS SECTIONAL AREA RATIO Rs [—] | THICK- NESS OF CELL WALLS w [mm] | CELL DENSITY C [cells/ mm$^2$] | PERMEABILITY COEFFICIENT OF EXHAUST GAS k [µm$^2$] | AVERAGE PORE SIZE [µm] | POROS- ITY [%] | OUTER DIAMETER φ [mm] | THIRD MEASURED VALUE [mm] | THIRD STANDARD VALUE (CALCULATED VALUE) L3 [mm] |
|---|---|---|---|---|---|---|---|---|---|
| C61 | 1.1 | 0.2 | 0.31 | 0.3 | 10 | 50 | 80 | 175 | 175 |
| C62 | 1.1 | 0.31 | 0.47 | 0.3 | 10 | 50 | 115 | 145 | 143 |
| C63 | 1.1 | 0.47 | 0.62 | 0.3 | 10 | 50 | 150 | 115 | 114 |
| C64 | 1.1 | 0.47 | 0.31 | 0.7 | 18 | 60 | 80 | 165 | 165 |
| C65 | 1.1 | 0.31 | 0.47 | 0.3 | 10 | 50 | 150 | 140 | 138 |
| C66 | 1.1 | 0.31 | 0.62 | 0.3 | 10 | 50 | 80 | 125 | 124 |
| C67 | 1.1 | 0.31 | 0.31 | 0.7 | 18 | 60 | 115 | 150 | 150 |
| C68 | 1.1 | 0.47 | 0.31 | 0.3 | 10 | 50 | 115 | 180 | 178 |
| C69 | 1.1 | 0.47 | 0.62 | 1.1 | 25 | 65 | 80 | 100 | 100 |
| C70 | 5 | 0.2 | 0.31 | 0.3 | 10 | 50 | 80 | 105 | 107 |
| C71 | 5 | 0.31 | 0.47 | 0.3 | 10 | 50 | 115 | 75 | 75 |
| C72 | 5 | 0.47 | 0.62 | 0.3 | 10 | 50 | 150 | 50 | 46 |
| C73 | 5 | 0.47 | 0.31 | 0.7 | 18 | 60 | 80 | 95 | 97 |
| C74 | 5 | 0.31 | 0.47 | 0.3 | 10 | 50 | 150 | 70 | 69 |
| C75 | 5 | 0.31 | 0.62 | 0.3 | 10 | 50 | 80 | 60 | 58 |
| C76 | 5 | 0.31 | 0.31 | 0.7 | 18 | 60 | 115 | 85 | 82 |
| C77 | 5 | 0.47 | 0.31 | 0.3 | 10 | 50 | 115 | 110 | 110 |
| C78 | 5 | 0.47 | 0.62 | 1.1 | 25 | 65 | 80 | 40 | 32 |

| TEST SAMPLES | COLLEC- TION RATIO [%] | PRESSURE LOSS EVALU- ATION 1 | COLLEC- TION RATIO EVALU- ATION 1 | CRITERION LENGTH MEASURED VALUE [mm] | OPEN CRITICAL LENGTH (CALCULATED VALUE) Lm [mm] | COLLEC- TION LIMIT RATIO [%] | PRESSURE LOSS EVALU- ATION 2 | COLLEC- TION RATIO EVALU- ATION 2 |
|---|---|---|---|---|---|---|---|---|
| C61 | 45% | A | A | 300 | 298 | 50% | C | A |
| C62 | 48% | A | A | 270 | 271 | 53% | B | A |
| C63 | 48% | A | A | 240 | 242 | 53% | B | A |
| C64 | 41% | A | B | 230 | 230 | 46% | B | A |
| C65 | 48% | A | A | 270 | 270 | 53% | B | A |
| C66 | 48% | A | A | 235 | 236 | 53% | B | A |
| C67 | 35% | A | B | 225 | 223 | 39% | B | B |
| C68 | 48% | A | A | 315 | 315 | 53% | C | A |
| C69 | 36% | A | B | 135 | 134 | 40% | A | B |
| C70 | 76% | C | A | 245 | 243 | 84% | C | A |
| C71 | 79% | C | A | 215 | 216 | 87% | C | A |
| C72 | 79% | C | A | 185 | 187 | 88% | C | A |
| C73 | 69% | B | A | 175 | 175 | 76% | B | A |
| C74 | 79% | C | A | 215 | 215 | 87% | C | A |
| C75 | 79% | C | A | 180 | 181 | 87% | C | A |
| C76 | 59% | B | A | 170 | 168 | 65% | B | A |
| C77 | 79% | C | A | 260 | 260 | 88% | C | A |
| C78 | 61% | A | A | 80 | 79 | 67% | A | A |

As can be understood from Table 12 to Table 13, the third standard value L3 calculated by the equation (3) is approximately equal to the third measured value obtained by the experiment. According to the equation (3), it can be recognized for the equation (3) to calculate the minimum value of the base member length L (i.e. the total length) with high accuracy when the collection ratio became not less than 90% while considering influence from the parameters of the exhaust gas filter 1.

(Fifth Exemplary Embodiment)

A description will be given of the exhaust gas filter according to the fifth exemplary embodiment.

As shown in FIG. 5, the fifth exemplary embodiment used the exhaust gas filter 1 which supports catalyst therein. This structure of the exhaust gas filter 1 makes it possible to eliminate harmful matter from exhaust gas. The exhaust gas filter 1 has three-way catalyst which contains at least one kinds of Pt, Rh and Pd.

The exhaust gas filter 1 according to the fifth exemplary embodiment has the base structure equal to the base structure of the exhaust gas filter 1 according to the first exemplary embodiment. In addition to this structure, the exhaust gas filter 1 according to the fifth exemplary embodiment supports catalyst therein. Specifically, in the exhaust gas filter 1 according to the fifth exemplary embodiment has the structure in which the surface of the cell walls 2 which faces the open cells 31 and the plugged cells 32, and the surface of the pores formed in the cell walls 3 are covered with a catalyst coat layer 4. The catalyst coat layer 4 contains catalyst. The catalyst coat layer 4 is made of a porous support member containing alumina, cocatalyst supported on the porous support member and noble metal catalyst supported by the cocatalyst. In the catalyst coat layer 4, the cocatalyst is made of ceria-zirconia composite oxide, and the noble metal catalyst is made of platinum Pt. The noble metal catalyst contains at least one kind of Pt, Rh and Pd according to the type of exhaust gas purified by the exhaust gas filter. The catalyst coat layer 4 is uniformly formed on the overall surface of the cell walls 2.

It is preferable for the exhaust gas filter 1 to support an amount of catalyst within a range of 10 to 150 g/L. This catalyst support amount represents mass of the catalyst coat layer 4 supported by the porous support member per 1 L in volume of the exhaust gas filter 1.

When the catalyst support amount is less than 10 g/L in the exhaust gas filter 1, the is structure reduces the effect of the exhaust gas filter 1 for eliminating harmful matter from exhaust gas.

On the other hand, when the catalyst support amount exceeds 150 g/L in the exhaust gas filter 1, it becomes difficult for exhaust gas to smoothly pass through the cell walls 2. This structure reduces the collection ratio of the in the exhaust gas filter 1.

It is more preferable for the exhaust gas filter 1 to support an amount of catalyst within a range of 10 to 100 g/L. When having the catalyst support amount of not more than 100 g/L, this structure of the exhaust gas filter 1 makes it possible to prevent the collection ratio from reducing. It is also preferable for the catalyst coat layer 4 to have the amount of the noble metal catalyst within a range of 0.1 to 5 g/L.

The exhaust gas filter 1 according to the fifth exemplary embodiment has the base member length L of not less than the first standard value L1 determined by the equation (1) explained in the explanation of the first exemplary embodiment.

However, the concept of the present invention is not limited by this structure. It is acceptable for the exhaust gas filter 1 according to the fifth exemplary embodiment to have the base member length L of not less than the second standard value L2 determined by the equation (2) explained in the second exemplary embodiment. Further, it is also acceptable for the exhaust gas filter 1 according to the fifth exemplary embodiment to have the base member length L of not less than the third standard value L3 determined by the equation (3) explained in the third exemplary embodiment.

Next, a description will be given of an example of the method of supporting catalyst in the exhaust gas filter 1.

Before supporting catalyst, an exhaust gas filter is immersed in catalyst slurry having an adjusted viscosity which has been prepared by using a mixture of Pt as noble metal catalyst, ceria-zirconia composite oxide as the supporting member and γ alumina. The catalyst slurry is adhered in the inside of the inside of the cells 3 of the exhaust gas filter. The exhaust gas filter is taken out from the catalyst slurry. Excess slurry is removed from the exhaust gas filter by using air blow so as to prevent pores formed in the cell walls 2 from clogged. The exhaust gas filter is dried at a temperature within a range of 80 to 150° C. during a period within a range of one to six hours, and then fired at a temperature within a range of 450 to 700° C. during a period within a range of 0.5 to 6 hours. For example, the exhaust gas filter is dried at a temperature of 100° C. for three hours, and fired at a temperature of 500° C. for three hours so as to produce the exhaust gas filter 1 in which catalyst is supported. It is also acceptable to use another method of supporting catalyst in the exhaust gas filter 1.

Other components of the exhaust gas filter according to the fifth exemplary embodiment are the same as those of the exhaust gas filter 1 according to the first exemplary embodiment. The same components are designated by using the same reference number and characters.

Because the exhaust gas filter 1 according to the fifth exemplary embodiment supports catalyst therein, this structure makes it possible to remove harmful components from exhaust gas. The exhaust gas filter according to the fifth exemplary embodiment has the same effects of the exhaust gas filter according to the first exemplary embodiment.

(Seventh Recognition Test)

A description will now be given of the seventh recognition test. As shown in Table 16 to Table 18, the seventh recognition test detected the influence of the exhaust gas filter supporting catalyst to the permeability coefficient k ($\mu m^2$) to exhaust gas. Specifically, the seventh recognition test used the test samples A1, A9 and A11, which have been used in the fourth recognition test previously described. The seventh recognition test further added a different amount of catalyst into the test samples A1, A9 and A11, respectively, and detected a permeability coefficient k ($\mu m^2$) to exhaust gas in each of the test samples.

That is, the seventh recognition test prepared a test sample D1a having a structure in which the catalyst coat layer 4 of 50 g/L was formed in and supported by the test sample A1 used in the fourth recognition test, a test sample D1b having a structure in which the catalyst coat layer 4 of 100 g/L was formed in and supported by the test sample A1 used in the fourth recognition test, and a test sample D1c having a structure in which the catalyst coat layer 4 of 150 g/L was formed in and supported by the test sample A1 used in the fourth recognition test. The seventh recognition test detected the permeability coefficient k to exhaust gas of each of the test samples D1a, D1b and D1c.

The seventh recognition test detected the permeability coefficient k to exhaust gas of each of the test samples D1a, D1b and D1c by the following method.

Each of the test samples detected was cut to form a test piece having an outer diameter of 15 mm. The produced test piece was mounted to Perm-Porometer (CEP-1100 AXSHJ) manufactured by Porous Materials Inc. The seventh recognition test supplied gas of a constant flow amount Q at a temperature of 25° C. to each of the test pieces. The seventh recognition test detected a pressure loss ΔP which is a difference in pressure between the gas at the upstream of each test piece and the gas at the downstream side of each piece. The seventh recognition test executed this test while changing the gas flow amount Q. The seventh recognition test detected the pressure loss ΔP every gas flow amount Q, and calculated the permeability coefficient k of gas on the basis of the following principal.

The permeability coefficient k of gas and the pressure loss pressure loss ΔP satisfy Darcy's gas permeability equation Q=(A/μw) ×k×ΔP, where μ represents a gas viscosity which is determined on the basis of a temperature of gas and a type of gas, A represents an area of the test piece, and w indicates a thickness of cell walls. That is, in the Darcy's gas permeability equation, the area A, the gas viscosity μ and the thickness w of cell walls are determined due to the temperature of gas, the type of gas, and a specification of the test piece. It is accordingly possible to calculate the permeability coefficient k of gas on the basis of a slope (A/w) of the pressure loss ΔP due to the gas flow amount Q, and the area A, the gas viscosity μ and the thickness w of the cell walls.

Similar to the detection of the test samples D1a, D1b and D1c corresponding to the test sample A1, previously described, the seventh recognition test detected the permeability coefficient k of gas in each of the test samples corresponding to the test samples A9 and A11.

The test samples A1, A9 and A11 have a different permeability coefficient k of gas. Table 16 to Table 18 show the detection results of the permeability coefficient k of gas in each of the test samples.

In table 17, the test sample D9a, D9b, and D9c corresponding to the test sample A9 had the catalyst coat layer 4 having the catalyst support amount of 50 g/L, 100 g/L and 150 g/L, respectively. In table 18, the test sample D11a, D11b, and D11c corresponding to the test sample A11 had the catalyst coat layer 4 having the catalyst support amount of 50 g/L, 100 g/L and 150 g/L, respectively.

The reduction ratio in Table 16 to Table 18 represents a reduction ratio of the permeability coefficient k to exhaust gas of each test sample to the permeability coefficient k to exhaust gas of a test sample without any catalyst.

TABLE 16

| | CATALYST SUPPORT AMOUNT [g/L] | PERMEABILITY COEFFICIENT k [μm$^2$] TO EXHAUST GAS | REDUCTION RATIO [%] |
| --- | --- | --- | --- |
| TEST SAMPLE A1 | 0 | 0.3 | 0 |
| TEST SAMPLE D1a | 50 | 0.24 | 20 |
| TEST SAMPLE D1b | 100 | 0.18 | 40 |
| TEST SAMPLE D1c | 150 | 0.15 | 50 |

TABLE 17

| | CATALYST SUPPORT AMOUNT [g/L] | PERMEABILITY COEFFICIENT k [μm$^2$] TO EXHAUST GAS | REDUCTION RATIO [%] |
| --- | --- | --- | --- |
| TEST SAMPLE A9 | 0 | 1.1 | 0 |
| TEST SAMPLE D9a | 50 | 0.9 | 18.2 |
| TEST SAMPLE D9b | 100 | 0.7 | 36.4 |
| TEST SAMPLE D9c | 150 | 0.5 | 54.5 |

TABLE 18

| | CATALYST SUPPORT AMOUNT [g/L] | PERMEABILITY COEFFICIENT k [μm$^2$] TO EXHAUST GAS | REDUCTION RATIO [%] |
| --- | --- | --- | --- |
| TEST SAMPLE A11 | 0 | 0.7 | 0 |
| TEST SAMPLE D11a | 50 | 0.57 | 18.6 |
| TEST SAMPLE D11b | 100 | 0.44 | 37.1 |
| TEST SAMPLE D11c | 150 | 0.32 | 54.3 |

As can be understood from the detection results shown in Table 16 to table 18, the smaller the permeability coefficient k of each of the test samples A1, A9 and A11 becomes, the more the catalyst support amount of the exhaust gas filter increases. Further, each of the test samples A1, A9 and A11 has the same reduction ratio when the catalyst coat layer 4 thereof has the same catalyst support amount. That is, the exhaust gas filters having a different permeability coefficient k and a different structure of the base member have the same reduction ratio, as shown in Table 16 to Table 18, when the catalyst coat layer 4 thereof has the same catalyst support amount.

(Eighth Recognition Test)

A description will now be given of the eighth recognition test. The eighth recognition test executed the same experiment of the fourth recognition test for the exhaust gas filter 1 according to the fifth exemplary embodiment.

The eighth recognition test recognized that the test samples of the exhaust gas filter according to the fifth exemplary embodiment which supported catalyst therein satisfies the following. The first measured value was approximately equal to the first standard value L1 determined by using the equation (1), where, the first measured value as an actual measured value was the minimum length of the base member length having the collection ratio obtained by subtracting a value of 10% from the collection limit ratio.

Further, the eighth recognition test recognized that the test samples of the exhaust gas filter according to the fifth exemplary embodiment which supported catalyst therein satisfies the following. The critical length measured value was approximately equal to the stairwell critical length Lm determined by the equation (M), i.e. the critical length Lm, where the critical length measured value is a length at which the collection ratio due to increasing of the base member length L stops increasing.

The eighth recognition test further executed the evaluation of the pressure loss and the collection ratio of the exhaust gas filter which supported catalyst.

In order to obtain the first measured value, the eighth recognition test used the test samples D1a, D1b, D9a, D9b, D11a, D11b having the basic structure which was the same as the basic structure of the exhaust gas filter 1 according to the fifth exemplary embodiment, but those test samples D1a, D1b, D9a, D9b, D11a, D11b had a different catalyst support amount, a different flow passage cross sectional area ratio Rs, a different thickness w of the cell walls, a different permeability coefficient k, a different cell density C, and a different outer diameter ϕ, respectively, as shown in Table 19. In particular, the test samples D1a and D1b were the exhaust gas filter 1 in which the catalyst coat layer 4 having a different catalyst support amount was formed in the test sample A1 used in the fourth recognition test.

The test samples D9a and D9b were the exhaust gas filter 1 in which the catalyst coat layer 4 having a different catalyst support amount was formed in the test sample A9 used in the fourth recognition test.

The test samples D11a and D11b were the exhaust gas filter 1 in which the catalyst coat layer 4 having a different catalyst support amount was formed in the test sample A11 used in the fourth recognition test.

The eighth recognition test measured the pressure loss and the collection ratio of the exhaust gas filter as the test samples having the first measured value, and further measured the pressure loss and the collection ratio of the exhaust gas filter as the test samples having the critical length measured value. The eighth recognition test evaluated the pressure loss and the collection ratio of those test samples on the basis of the following judgment standard.

The eighth recognition test executed the evaluation of the pressure loss and the collection ratio of those test samples on the basis of the evaluation standard samples H1, H1a and H1b. The evaluation standard sample H1 had the same structure of the test sample 1 used in the second recognition test. The evaluation standard sample H1a had the structure in which the catalyst coat layer having the catalyst support amount of 50 g/L was formed in the evaluation standard sample H1. The evaluation standard sample H1b had the structure in which the catalyst coat layer having the catalyst support amount of 100 g/L was formed in the evaluation standard sample H1. Those standard samples H1, H1a and H1b were the exhaust gas filter having the flow passage cross sectional area ratio Rs of 1.0.

In the evaluation of the pressure loss of the test samples A1, A9 and A11 having the catalyst support amount of 0 g/L, the eighth recognition test executed the evaluation of the pressure loss, and assigned the evaluation character "A" to the test sample having a pressure loss of less than 1.5 times of the pressure loss (=1.0) of the evaluation standard sample H1 having the catalyst support amount of 0 g/L, and assigned the evaluation character "B" to the test sample having the pressure loss of not less than 1.5 times and less than 2.0 times of the pressure loss of this evaluation standard sample H1, and assigned the evaluation character "C" to the test sample having a pressure loss of less than 2.0 times of the pressure loss of this evaluation standard sample H1.

Further, the eighth recognition test executed the evaluation of the collection ratio of each of the test samples A1, A9 and A11, and assigned the evaluation character "A" to the test sample having a collection ratio which is not less than the collection ratio of this evaluation standard sample H1, and assigned the evaluation character "B" to the test sample having a collection ratio of less than the collection ratio of this evaluation standard sample H1.

In the evaluation of the pressure loss of the test samples A1a, A9a and A11a having the catalyst support amount of 50 g/L, the eighth recognition test assigned the evaluation character "A" to the test sample having the pressure loss of less than 1.5 times of the pressure loss (=1.0) of the evaluation standard sample H1a having the catalyst support amount of 50 g/L, assigned the evaluation character "B" to the test sample having a pressure loss of not less than 1.5 times and less than 2.0 times of the pressure loss of this evaluation standard sample H1a, and assigned the evaluation character "C" to the test sample having a pressure loss of less than 2.0 times of the pressure loss of this evaluation standard sample H1a.

Further, the eighth recognition test executed the evaluation of the collection ratio of each of the test samples A1a, A9a and A11a, and assigned the evaluation character "A" to the test sample having a collection ratio which is not less than the collection ratio of this evaluation standard sample H1a, and assigned the evaluation character "B" to the test sample having a collection ratio of less than the collection ratio of this evaluation standard sample H1a.

In the evaluation of the pressure loss of the test samples A1b, A9b and A11 b having the catalyst support amount of 100 g/L, the eighth recognition test assigned the evaluation character "A" to the test sample having the pressure loss of less than 1.5 times of the pressure loss (=1.0) of the evaluation standard sample H1a having the catalyst support amount of 50 g/L, assigned the evaluation character "B" to the test sample having a pressure loss of not less than 1.5 times and less than 2.0 times of the pressure loss of this evaluation standard sample H1a, and assigned the evaluation character "C" to the test sample having a pressure loss of less than 2.0 times of the pressure loss of this evaluation standard sample H1a.

Further, the eighth recognition test executed the evaluation of the collection ratio of each of the test samples A1b, A9b and A11b, and assigned the evaluation character "A" to the test sample having a collection ratio which is not less than the collection ratio of this evaluation standard sample H1b, and assigned the evaluation character "B" to the test sample having a collection ratio of less than the collection ratio of this evaluation standard sample H1b.

Table 19 shows the pressure loss evaluation 1 and the collection ratio evaluation 1 as the evaluation results of the pressure loss and the collection ratio of the exhaust gas filter having the first measured value as the base member length L. Table 19 further shows the pressure loss evaluation 2 and the collection ratio evaluation 2 as the evaluation results of the pressure loss and the collection ratio of the exhaust gas filter having the critical length measured value as the base member length L.

The eighth recognition test used the same test conditions, the same test method of the fourth recognition test. Table 19 shows the test results of the eighth recognition test. Table 19 further shows, for reference, the test results of the test samples A1, A9 and A11 used in the fourth recognition test, and shows the evaluation standard sample H1.

TABLE 19

| TEST SAMPLES | CATALYST SUPPORT AMOUNT [g/L] | FLOW PASSAGE CROSS SECTIONAL AREA RATIO Rs [—] | THICK- NESS OF CELL WALLS w [mm] | CELL DENSITY C [cells/ mm$^2$] | PERMEABILITY COEFFICIENT OF EXHAUST GAS k [μm$^2$] | AVERAGE PORE SIZE [μm] | POROS- ITY [%] | OUTER DIAMETER ϕ [mm] | FIRST MEASURED VALUE [mm] |
|---|---|---|---|---|---|---|---|---|---|
| H1 | 0 | 1 | 0.28 | 0.47 | 0.7 | 18 | 60 | 132 | 90 |
| H1a | 50 | 1 | 0.28 | 0.47 | 0.57 | 18 | 60 | 132 | 90 |
| H1b | 100 | 1 | 0.28 | 0.47 | 0.44 | 18 | 60 | 132 | 95 |

TABLE 19-continued

| | | | | | | | | | |
|---|---|---|---|---|---|---|---|---|---|
| A1 | 0 | 1.7 | 0.13 | 0.31 | 0.3 | 10 | 50 | 80 | 120 |
| D1a | 50 | 1.7 | 0.13 | 0.31 | 0.24 | 10 | 50 | 80 | 130 |
| D1b | 100 | 1.7 | 0.13 | 0.31 | 0.18 | 10 | 50 | 80 | 145 |
| A9 | 0 | 1.7 | 0.3 | 0.47 | 1.1 | 25 | 65 | 115 | 80 |
| D9a | 50 | 1.7 | 0.3 | 0.47 | 0.9 | 25 | 65 | 115 | 85 |
| D9b | 100 | 1.7 | 0.3 | 0.47 | 0.7 | 25 | 65 | 115 | 85 |
| A11 | 0 | 2.3 | 0.2 | 0.62 | 0.7 | 18 | 60 | 80 | 60 |
| D11a | 50 | 2.3 | 0.2 | 0.62 | 0.57 | 18 | 60 | 80 | 65 |
| D11b | 100 | 2.3 | 0.2 | 0.62 | 0.44 | 18 | 60 | 80 | 70 |

| TEST SAMPLES | FIRST STANDARD VALUE (CALCULATED VALUE) L1 [mm] | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|---|
| H1 | 88 | 32% | — | — | 185 | 184 | 42% | — | — |
| H1a | 91 | 24% | — | — | 200 | 198 | 34% | — | — |
| H1b | 96 | 16% | — | — | 220 | 222 | 26% | — | — |
| A1 | 122 | 53% | A | A | 275 | 276 | 63% | C | A |
| D1a | 130 | 45% | A | A | 315 | 314 | 53% | C | A |
| D1b | 144 | 38% | B | A | 375 | 376 | 43% | C | A |
| A9 | 81 | 41% | A | A | 155 | 155 | 50% | A | A |
| D9a | 83 | 32% | A | A | 165 | 164 | 42% | A | A |
| D9b | 86 | 25% | A | A | 180 | 179 | 35% | A | A |
| A11 | 61 | 45% | A | A | 125 | 127 | 54% | A | A |
| D11a | 64 | 36% | A | A | 140 | 142 | 46% | A | A |
| D11b | 69 | 29% | A | A | 165 | 165 | 39% | A | A |

It can be understood from Table 19 that in the exhaust gas filter in which catalyst is supported, the first standard value L1 obtained by the equation (1) is approximately equal to the first measured value measured by the eighth recognition test. According to the equation (1), it can be recognized for the equation (1) to calculate the minimum value of the base member length L with high accuracy when the collection ratio became not less than a value obtained by subtracting a value of 10% from the collection limit ratio while considering influence from the parameters of the exhaust gas filter 1 in which catalyst is supported.

It can be recognized from Table 19 that in the exhaust gas filter in which catalyst is supported, the stairwell critical length Lm, i.e. the critical length calculated by the equation (M) was approximately equal to the critical length measured value obtained by the experimental test. According to the equation (M), it can be recognized for the equation (M) to calculate the minimum value of the base member length L with high accuracy when the collection ratio became not less than a value obtained by subtracting a value of 1% from the collection limit ratio while considering influence from the parameters of the exhaust gas filter 1 in which catalyst is supported.

Furthermore, as can be understood from Table 19, it can be recognized that there is the tendency in which the collection ratio improves, i.e. becomes increased according to increasing of the base member length L, like the results of the fourth recognition test, and the pressure loss is improved, i.e., becomes reduced according to reducing of the base member length L. In other words, it can be understood that the longer the base member length L is, the more the pressure loss is reduced, and the shorter the base member length L is, the more the collection ratio is reduced.

The base member length, i.e. the total length of the exhaust gas filter has an optimum length capable of improving both the pressure loss and the collection ratio simultaneously, not too long or not too short.

Because of having the base member length L which is not less than the first standard value L1 calculated by the equation (1) with high accuracy, it is possible for the exhaust gas filter 1 according to the fifth exemplary embodiment to have the high collection ratio. Furthermore, because of having the base member length L which is not more than the critical length Lm calculated by the equation (M) with high accuracy, it is possible for the exhaust gas filter 1 according to the fifth exemplary embodiment to have the reduced pressure loss. That is, because the exhaust gas filter has the base member length within the range of not less than the first standard value L1 and not more than the critical length Lm, it is possible for the exhaust gas filter to improve the pressure loss and the collection ratio simultaneously.

(Ninth Recognition Test)

A description will now be given of the ninth recognition test. The eighth recognition test executed the same experiment of the fifth recognition test for the exhaust gas filter 1 according to the fifth exemplary embodiment.

That is, the ninth recognition test has recognized that the second standard value L2 satisfying the equation (2) is approximately equal to the second measured value, as the minimum length of the base member length L, i.e. the total length when the exhaust gas filter in which catalyst is supported has the collection ratio became not less than 50%.

In order to obtain the second measured value, the ninth recognition test used the test samples E4a, E15a and E17a having the basic structure which is the same as the basic structure of the exhaust gas filter 1 according to the fifth exemplary embodiment, but those test samples E4a, E15a and E17a had a different catalyst support amount, a different flow passage cross sectional area ratio Rs, a different thickness w of the cell walls, a different permeability coefficient k, a different cell density C, and a different outer diameter φ, respectively, as shown in Table 20. In particular, the test sample E4a was the exhaust gas filter 1 in which the catalyst coat layer 4 having the catalyst support amount of 50 g/L was formed in the test sample B4 used in the fifth recognition test. The test sample E15a was the exhaust gas filter 1 in which the catalyst coat layer 4 having the catalyst support amount of 50 g/L was formed in the test sample B15 used in the fifth recognition test. The test sample E17a was the exhaust gas filter 1 in which the catalyst coat layer 4 having the catalyst support amount of 50 g/L was formed in the test sample B17 used in the fifth recognition test.

lection ratio evaluation 2 of each of the test samples in the ninth recognition test have the evaluation character "A", the evaluation results of the collection ratio of each of the test samples are omitted from Table 20.

TABLE 20

| TEST SAMPLES | CATALYST SUPPORT AMOUNT [g/L] | FLOW PASSAGE CROSS SECTIONAL AREA RATIO Rs [—] | THICK-NESS OF CELL WALLS w [mm] | CELL DENSITY C [cells/mm²] | PERMEABILITY COEFFICIENT OF EXHAUST GAS k [μm²] | AVERAGE PORE SIZE [μm] | POROS-ITY [%] | OUTER DIAMETER φ [mm] | SECOND MEASURED VALUE [mm] |
|---|---|---|---|---|---|---|---|---|---|
| B4 | 0 | 1.7 | 0.3 | 0.31 | 0.7 | 18 | 60 | 80 | 125 |
| E4a | 50 | 1.7 | 0.3 | 0.31 | 0.57 | 18 | 60 | 80 | 125 |
| B15 | 0 | 3 | 0.3 | 0.31 | 1.1 | 25 | 65 | 150 | 75 |
| E15a | 50 | 3 | 0.3 | 0.31 | 0.9 | 25 | 65 | 150 | 75 |
| B17 | 0 | 1.7 | 0.13 | 0.62 | 0.3 | 10 | 50 | 80 | 90 |
| E17a | 50 | 1.7 | 0.13 | 0.62 | 0.24 | 10 | 50 | 80 | 95 |

| TEST SAMPLES | SECOND STANDARD VALUE (CALCULATED VALUE) L2 [mm] | COLLEC-TION RATIO [%] | PRESSURE LOSS EVALU-ATION 1 | CRITERION LENGTH MEASURED VALUE [mm] | OPEN CRITICAL LENGTH (CALCULATED VALUE) Lm [mm] | COLLEC-TION LIMIT RATIO [%] | PRESSURE LOSS EVALU-ATION 2 |
|---|---|---|---|---|---|---|---|
| B4 | 125 | 50% | A | 215 | 217 | 63% | A |
| E4a | 126 | 50% | A | 230 | 232 | 55% | A |
| B15 | 77 | 50% | A | 175 | 176 | 61% | A |
| E15a | 77 | 50% | A | 185 | 185 | 53% | A |
| B17 | 93 | 50% | A | 205 | 203 | 63% | A |
| E17a | 93 | 50% | A | 240 | 241 | 52% | B |

Each of the test samples B4, B15 and B17 used in the fifth recognition test in which the catalyst coat layer had the catalyst support amount of 100 g/L has the collection limit ratio of less than 50%.

Similar to the eighth recognition test, the ninth recognition test executed the evaluation of the pressure loss and the collection ratio of the exhaust gas filter as the test samples.

The ninth recognition test used the evaluation standard sample H1 having the catalyst support amount of 0 g/L, which was also used in the eighth recognition test so as to evaluate the test samples B4, B15 and B17 having the catalyst support amount of 0 g/L. Further, the ninth recognition test executes the evaluation standard sample H1a having the catalyst support amount of 50 g/L used in the eighth recognition test so as to evaluate the test samples B4a, B15a and B17a having the catalyst support amount of 0 g/L.

The ninth recognition test executed the evaluation in pressure loss and collection ratio of each of the test samples on the basis of the same evaluation standard used by the eighth recognition test.

The ninth recognition test used the same test conditions, the same test method of the fifth recognition test. Table 20 shows the test results of the ninth recognition test. Table 20 further shows, for reference, the test results of the test samples B4, B15 and B17 used in the fifth recognition test, and shows the evaluation standard sample H1. The ninth recognition test executed the evaluation in pressure loss and collection ratio of the test samples B4, B15 and B17 on the basis of the evaluation standard sample H1.

Further, Table 20 shows the pressure loss evaluation 1 and the collection ratio evaluation 1 as the evaluation results of the pressure loss and the collection ratio of the exhaust gas filter having the second measured value as the base member length L.

Similar to the evaluation results of the fifth recognition test, because the collection ratio evaluation 1 and the col- It can be understood from Table 20 that in the exhaust gas filter in which catalyst is supported, the second standard value L2 obtained by the equation (2) is approximately equal to the second measured value measured by the ninth recognition test. According to the equation (2), it can be recognized that the minimum value of the base member length L can be calculated with high accuracy when the collection ratio became not less than not less than 50% while considering influence from the parameters of the exhaust gas filter 1 in which catalyst is supported.

(Tenth Recognition Test)

A description will now be given of the tenth recognition test. The tenth recognition test executed the same experiment of the sixth recognition test for the exhaust gas filter 1 according to the fifth exemplary embodiment.

That is, the tenth recognition test has recognized that the third standard value L3 satisfying the equation (3) is approximately equal to the third measured value, as the minimum length of the base member length L, i.e. the total length when the exhaust gas filter in which catalyst is supported has the collection limit ratio became not less than 90%.

In order to obtain the third measured value, the tenth recognition test used the test samples F4a, F4b, F9a, F9b and F23a and F23b having the basic structure which is the same as the basic structure of the exhaust gas filter 1 according to the fifth exemplary embodiment, but those test samples F4a, F4b, F9a, F9b and F23a had a different catalyst support amount, a different flow passage cross sectional area ratio Rs, a different thickness w of the cell walls, a different permeability coefficient k, a different cell density C, and a different outer diameter φ, respectively, as shown in Table 21. In particular, the test samples F4a and F4b were the exhaust gas filter 1 in which the catalyst coat layer 4 having a different catalyst support amount was formed in the test sample C4 used in the sixth recognition test. The test samples F9a and F9b were the exhaust gas filter 1 in which the catalyst coat layer 4 having a different catalyst support amount was formed in the test sample C9 used in the sixth recognition test. The test sample F23a and F23b were the exhaust gas filter 1 in which the catalyst coat layer 4 having a different catalyst support amount was formed in the test sample C23 used in the sixth recognition test.

Similar to the ninth recognition test, the tenth recognition test executed the evaluation of the pressure loss and the collection ratio of the exhaust gas filter as the test samples. The tenth recognition test used evaluation standard samples J1, J1a and J1b as follows.

The evaluation standard sample J1 had the same basic structure of the test sample 1 used in the second recognition test 2, but had the base member length L which was different from the base member length of the test sample 1.

The evaluation standard sample J1a had the catalyst coat layer having the catalyst support amount off 50 g/L in addition to the basic structure of the evaluation standard sample J1. The evaluation standard sample J1b had the catalyst coat layer having the catalyst support amount off 100 g/L in addition to the basic structure of the evaluation standard sample J1. Each of the evaluation standard samples J1, J1a and J1b was the exhaust gas filter having the flow passage cross sectional area ratio Rs of 1.0.

The tenth evaluation test used the evaluation standard sample J1 having the catalyst support amount of 0 g/L so as to evaluate the test samples C4, C9 and C23 having the catalyst support amount of 0 g/L.

The tenth evaluation test used the evaluation standard sample J1a having the catalyst support amount of 50 g/L so as to evaluate the test samples F4a, F9a and F23a having the catalyst support amount of 50 g/L. The tenth evaluation test used the evaluation standard sample 31b having the catalyst support amount of 100 g/L so as to evaluate the test samples F4b, F9b and F23b having the catalyst support amount of 100 g/L.

The tenth recognition test evaluated the pressure loss and collection ratio of each of the test samples on the basis of the same evaluation standard used by the eighth recognition test.

The tenth recognition test used the same test conditions, the same test method of the sixth recognition test. Table 21 shows the test results of the tenth recognition test. Table 21 further shows, for reference, the test results of the test samples C4, C9 and C23 used in the sixth recognition test, and shows the evaluation standard sample HJ1.

Further, Table 21 shows the pressure loss evaluation 1 and the collection ratio evaluation 1 as the evaluation results of the pressure loss and the collection ratio of the exhaust gas filter having the third measured value as the base member length L.

TABLE 21

| TEST SAMPLES | CATALYST SUPPORT AMOUNT [g/L] | FLOW PASSAGE CROSS SECTIONAL AREA RATIO Rs [—] | THICKNESS OF CELL WALLS w [mm] | CELL DENSITY C [cells/mm$^2$] | PERMEABILITY COEFFICIENT OF EXHAUST GAS k [μm$^2$] | AVERAGE PORE SIZE [μm] | POROSITY [%] | OUTER DIAMETER φ [mm] | THIRD MEASURED VALUE [mm] |
|---|---|---|---|---|---|---|---|---|---|
| J1 | 0 | 1 | 0.28 | 0.47 | 0.7 | 18 | 60 | 132 | 115 |
| J1a | 50 | 1 | 0.28 | 0.47 | 0.57 | 18 | 60 | 132 | 120 |
| J1b | 100 | 1 | 0.28 | 0.47 | 0.44 | 18 | 60 | 132 | 125 |
| C4 | 0 | 1.7 | 0.2 | 0.47 | 0.3 | 10 | 50 | 115 | 130 |
| F4a | 50 | 1.7 | 0.2 | 0.47 | 0.24 | 10 | 50 | 115 | 140 |
| F4b | 100 | 1.7 | 0.2 | 0.47 | 0.18 | 10 | 50 | 115 | 155 |
| C9 | 0 | 1.7 | 0.3 | 0.47 | 1.1 | 25 | 65 | 115 | 105 |
| F9a | 50 | 1.7 | 0.3 | 0.47 | 0.9 | 25 | 65 | 115 | 110 |
| F9b | 100 | 1.7 | 0.3 | 0.47 | 0.7 | 25 | 65 | 115 | 110 |
| C23 | 0 | 3 | 0.2 | 0.47 | 0.7 | 18 | 60 | 80 | 95 |
| F23a | 50 | 3 | 0.2 | 0.47 | 0.57 | 18 | 60 | 80 | 100 |
| F23b | 100 | 3 | 0.2 | 0.47 | 0.44 | 18 | 60 | 80 | 105 |

| TEST SAMPLES | THIRD STANDARD VALUE (CALCULATED VALUE) L3 [mm] | COLLECTION RATIO [%] | PRESSURE LOSS EVALUATION 1 | COLLECTION RATIO EVALUATION 1 | CRITERION LENGTH MEASURED VALUE [mm] | OPEN CRITICAL LENGTH (CALCULATED VALUE) Lm [mm] | COLLECTION LIMIT RATIO [%] | PRESSURE LOSS EVALUATION 2 | COLLECTION RATIO EVALUATION 2 |
|---|---|---|---|---|---|---|---|---|---|
| J1 | 117 | 38% | — | — | 185 | 184 | 42% | — | — |
| J1a | 121 | 31% | — | — | 200 | 198 | 34% | — | — |
| J1b | 127 | 23% | — | — | 220 | 222 | 26% | — | — |
| C4 | 128 | 60% | A | A | 255 | 254 | 65% | B | A |
| F4a | 138 | 53% | A | A | 290 | 292 | 55% | C | A |
| F4b | 154 | 46% | B | A | 355 | 354 | 45% | C | A |
| C9 | 106 | 47% | A | A | 155 | 155 | 50% | A | A |
| F9a | 109 | 38% | A | A | 165 | 165 | 42% | A | A |
| F9b | 112 | 30% | A | A | 180 | 179 | 33% | A | A |
| C23 | 95 | 53% | A | A | 155 | 153 | 59% | A | A |
| F23a | 98 | 46% | A | A | 165 | 167 | 51% | A | A |
| F23b | 105 | 39% | A | A | 190 | 190 | 44% | A | A |

It can be understood from Table 21 that in the exhaust gas filter 1 supporting catalyst, the third standard value L3 calculated by the equation (3) is approximately equal to the third measured value obtained by the experiment. According to the equation (3), it can be recognized for the equation (3) to calculate the minimum value of the base member length L with high accuracy when the collection ratio becomes not less than 90% while considering influence from the parameters of the exhaust gas filter 1.

REFERENCE SIGNS LIST

1 Exhaust gas filter,
2 Cell walls,
3 Cells,
31 Open cells,
32 Plugged cells, and
321 Plug members.

The invention claimed is:

1. An exhaust gas filter capable of purifying exhaust gas which contains particulate matter emitted from an internal combustion engine, comprising:
    a plurality of cell walls; and
    a plurality of cells surrounded by the cell walls and formed along an axial direction of the exhaust gas filter, wherein
    pores are formed in the cell walls which are formed between the cells which are adjacently arranged from each other, the cells and comprising open cells and plugged cells, each of the open cells is open and forms a through hole, an end part at an upstream side of each of the plugged cells is plugged by a plug member, wherein
    the exhaust gas filter satisfies the following:
    on a cross section of the exhaust gas filter, which is perpendicular to the axial direction of the exhaust gas filter, a flow passage cross sectional area S2 of the plugged cells is larger than a flow passage cross sectional area S1 of the open cells, and a total length L of the exhaust gas filter is not less than a first standard value L1 which is determined by the following equation, and is not more than a critical length Lm which is determined by the following equation (M), where $$L1 = -3.7 \times Rs^{1.5} - 3.6/w + 9.7/k - 152.9 \times C + 2241.5/\phi + 145.1 \quad (1), \text{ and}$$

$$Lm = -5.5 \times Rs^{1.5} - 6.0/w + 44.9/k - 234.9 \times C + 176.7/\phi + 255.6 \quad (M),$$

where w indicates a thickness (mm) of each of the cell walls, k indicates a permeability coefficient ($\mu^2$) to exhaust gas, C indicates a cell density (cells/mm$^2$), $\phi$ designates an outer diameter (mm) of the exhaust gas filter, and Rs designates a flow passage cross sectional area ratio S1/S2.

2. The exhaust gas filter according to claim 1, wherein the thickness w (mm) of each of the cell walls is within a range of 0.13≤w≤0.47, the permeability coefficient k ($\mu^2$) to exhaust gas is within a range of 0.3≤k ≤1.1, and the cell density C (cells/mm$^2$) is within a range of 0.31≤C ≤0.62, and the outer diameter $\phi$(mm) of the exhaust gas filter has the is within a range of 80≤$\phi$≤150.

3. The exhaust gas filter according to claim 1, wherein the flow passage cross sectional area ratio Rs =S1/S2 is within a range of 1.1≤Rs<5.

4. The exhaust gas filter according to claim 1, wherein the cells comprise not less than two types of shapes.

5. The exhaust gas filter according to claim 4, wherein the cells comprises octagonal cells and rectangular cells, an inner periphery of each of the octagonal cells has an octagonal shape, and an inner periphery of each of the rectangular cells has a rectangular shape, and a hydraulic diameter of each of the octagonal cells is larger than a hydraulic diameter of each of the rectangular cells, and the octagonal cells and the rectangular cells are alternately arranged.

6. The exhaust gas filter according to claim 5, wherein the octagonal cells are the plugged cells and the rectangular cells are the open cells.

7. The exhaust gas filter according to claim 5, wherein all of the octagonal cells and a part of the rectangular cells are the plugged cells.

8. The exhaust gas filter according to claim 1, wherein all of the cells, which comprise the open cells and the plugged cells, are rectangular cells, and an inner periphery of each of the rectangular cells has a rectangular shape, and the cells are arranged so that the number of the plugged cells is greater than the number of the open cells.

9. The exhaust gas filter according to claim 1, wherein all of the cells, which comprise the open cells and the plugged cells, are rectangular cells, and an inner periphery of each of the rectangular cells has a rectangular shape, and the open cells and the plugged cells are alternately arranged in the exhaust gas filter.

* * * * *